(12) United States Patent
Obrovac et al.

(10) Patent No.: US 12,148,914 B2
(45) Date of Patent: Nov. 19, 2024

(54) ELECTROCHEMICALLY ACTIVE DISPERSIONS AND COMPOSITES FOR RECHARGEABLE BATTERY ANODES

(71) Applicant: Novonix Battery Technology Solutions Inc., Bedford (CA)

(72) Inventors: Mark Obrovac, Halifax (CA); Yidan Cao, Halifax (CA); Jun Wang, Halifax (CA)

(73) Assignee: Novonix Battery Technology Solutions Inc., Dartmouth (CA)

( * ) Notice: Subject to any disclaimer, the term of this patent is extended or adjusted under 35 U.S.C. 154(b) by 716 days.

(21) Appl. No.: 17/415,331

(22) PCT Filed: Dec. 6, 2019

(86) PCT No.: PCT/US2019/064956
§ 371 (c)(1),
(2) Date: Jun. 17, 2021

(87) PCT Pub. No.: WO2020/131429
PCT Pub. Date: Jun. 25, 2020

(65) Prior Publication Data
US 2022/0059812 A1 Feb. 24, 2022

Related U.S. Application Data

(60) Provisional application No. 62/782,008, filed on Dec. 19, 2018.

(51) Int. Cl.
*H01M 4/133* (2010.01)
*H01M 4/04* (2006.01)
(Continued)

(52) U.S. Cl.
CPC ......... *H01M 4/133* (2013.01); *H01M 4/0416* (2013.01); *H01M 4/134* (2013.01);
(Continued)

(58) Field of Classification Search
CPC .... H01M 4/133; H01M 4/0416; H01M 4/134; H01M 4/1393; H01M 4/1395; H01M 10/0525
See application file for complete search history.

(56) References Cited

U.S. PATENT DOCUMENTS 8,287,772 B2   10/2012  Le et al.
8,753,545 B2    6/2014  Obrovac et al.
(Continued)

FOREIGN PATENT DOCUMENTS

CA        3152799        10/2022
CN     103451461 A       12/2013
(Continued)

OTHER PUBLICATIONS

Chen et al., "Green Synthesis and Stable Li-Storage Performance of FeSi2/Si@C Nanocomposite for Lithium-Ion Batteries," ACS Applied Materials & Interfaces, vol. 4, pp. 3753-3758, (2012). (Year: 2012).*

(Continued)

*Primary Examiner* — Karie O'Neill Apicella
(74) *Attorney, Agent, or Firm* — Knobbe, Martens, Olson & Bear, LLP

(57) ABSTRACT

Particulate dispersions and composites are disclosed which comprise graphite and alloy particles comprising both active (e.g. Si) and inactive phases with regards to electrochemical activity with alkali or alkaline earth metals (e.g. lithium). The alloy particles are highly dispersed as primary particles with graphite particles and/or within the graphite particles' matrix in a novel manner and can be prepared using simple mechanofusion dry processing methods. In the composites prepared, the alloy particles are essentially embedded between layers in the graphite matrix. Improved performance can be obtained when these dispersions or composites are used in lithium insertion anodes for rechargeable (Continued)

lithium batteries, including high capacity, good cycling performance, and rate capability.

33 Claims, 22 Drawing Sheets

(51) Int. Cl.
    *H01M 4/134*     (2010.01)
    *H01M 4/1393*     (2010.01)
    *H01M 4/1395*     (2010.01)
    *H01M 10/0525*     (2010.01)

(52) U.S. Cl.
    CPC ....... *H01M 4/1393* (2013.01); *H01M 4/1395* (2013.01); *H01M 10/0525* (2013.01)

(56) References Cited

U.S. PATENT DOCUMENTS

| | | | |
|---|---|---|---|
| 9,029,016 B2 | 5/2015 | Lee et al. | |
| 9,142,832 B2 | 9/2015 | Suzuki et al. | |
| 9,859,553 B2 | 1/2018 | Morita et al. | |
| 10,050,260 B2 | 8/2018 | Obrovac et al. | |
| 2004/0131938 A1 | 7/2004 | Nishino et al. | |
| 2008/0206641 A1 | 8/2008 | Christensen et al. | |
| 2013/0295454 A1 | 11/2013 | Huang | |
| 2015/0228970 A1* | 8/2015 | Song | H01M 4/525 |
| | | | 429/231.95 |
| 2015/0255793 A1 | 9/2015 | Wakizaka et al. | |
| 2017/0098820 A1* | 4/2017 | Obrovac | H01M 4/622 |
| 2022/0331863 A1 | 10/2022 | Obrovac et al. | |

FOREIGN PATENT DOCUMENTS

| | | |
|---|---|---|
| EP | 1657768 A1 | 5/2006 |
| EP | 3900082 B1 | 4/2024 |
| JP | 2006-164952 A | 6/2006 |
| JP | 2006-216277 A | 8/2006 |
| JP | 2006-253126 A | 9/2006 |
| JP | 2022-510833 A | 1/2022 |
| WO | 2013/155397 A1 | 10/2013 |
| WO | 2016/150639 A1 | 9/2016 |
| WO | WO 2018/159870 A1 | 9/2018 |
| WO | WO 2019/198052 A1 | 10/2019 |
| WO | WO 2020/131429 A2 | 6/2020 |

OTHER PUBLICATIONS

Lee et al., "Carbon-coated nano-Si dispersed oxides/graphite composites as anode material for lithium ion batteries", Electrochemistry Communications, Elsevier, vol. 6, pp. 465-469, (2004). (Year: 2004).*
Office Action received in JP Patent Application No. 2021-528881, dated Dec. 20, 2023 in 11 pages.
Alonso et al., "Mechanism of the Combined Coating-Mechanofusion Processing of Powders," Powder Technology 59: 45-52 (1989).
Chen et al., "Numerical simulation of Mechanofusion system," Powder Technology 146: 121-136 (2004).
Chen et al., "Green Synthesis and Stable Li-Storage Performance of FeSi2/Si@C Nanocomposite for Lithium-Ion Batteries," ACS Applied Materials & Interfaces 4: 3753-3758 (2012).
Chevrier et al., "Evaluating Si-Based Materials for Li-IoN Batteries in Commercially Relevant Negative Electrodes," Journal of the Electrochemical Society 161: A783-A791 (2014).
Chou et al., "Preparation of Graphite/Nano-Powder Composite Particles and Applicability as Carbon Anode Material in a Lithium Ion Battle," Advanced Power Technology 19: 383-396 (2008).
Cui et al., "Carbon-Silicon Core-Shell Nanowires as High Capacity Electrode for Lithium Ion Batteries," Nano Lett. 9: 3370-3374 (2009).
Dimov et al., "Characterization of carbon-coated silicon Structural evolution and possible limitations," Journal of Power Sources 114:88-95 (2003).
Du et al., "High Energy Density Calendered Si Alloy/Graphite Anodes," Journal of The Electrochemical Society 161: A1698-A1705 (2014).
Lee et al., "Carbon-coated nano-Si dispersed oxides/graphite composite as anode material for lithium ion batteries," Electrochemistry Communications 6: 465-469 (2004).
Lin et al., "A high tap density secondary silicon particle anode fabricated by scalable mechanical pressing for lithium-ion batteries," Energy & Environmental Science (2015).
Liu et al., "Electrochemical Characterizations on Si and C-Coated Si Particle Electrodes for Lithium-Ion Batteries," Journal of The Electrochemical Society 152: A1719-A1725 (2005).
Liu et al., "Advanced Materials for Energy Storage," Advanced Energy Materials 22: E28-E62 (2010).
Liu et al., "A pomegranate-inspired nanoscale design for large-volume-change lithium battery anodes," Nature Nanotechnology (2014).
Marom et al., "A review of advanced and practical lithium battery materials," Journal of Materials Chemistry 21: 9938-9954 (2011).
"Mechano Fusion System AMS Designed for particle-to-particle combination in order to enhance particle performance" Kona 17: 244-250 (1999).
Naito et al., "Analysis of the Powder Composite Process by a Mechanical Method," Kona 11: 229-234 (1993).
Naito et al., "Applications of Communition Techniques for the Surface Modification of Powder Materials," ISIJ International 33: 915-924 (1993).
Ng et al., "Highly Reversible Lithium Storage in Spheroidal Carbon-Coated Silicone Nancomposites as Anodes for Lithium-Ion Batteries," Angew. Chem. Int. Ed. 45: 6896-6899 (2006).
Obrovac et al., "Alloy Design for Lithium-Ion Battery Anodes," Journal of the Electrochemical Science 154: A849-A855 (2007).
Obrovac et al., "Alloy Negative Electrodes for Li-Ion Batteries," Chemical Reviews 114: 11444-11502 (2014).
Park et al., "Si-Encapsulating Hollow Carbon Electrodes via Electroless Etching for Lithium-Ion Batteries," Advanced Energy Materials 3: 206-212 (2013).
Pfeffer et al., "Synthesis of engineered particulates with tailored properties using dry particle coating," Powder Technology 117: 40-67 (2001).
Si et al., "Highly reversible carbon-nano-silicon composite anodes for lithium rechargeable batteries," Journal of Power Sources 189: 761-765 (2009).
Li et al., "A High Capacity Nano-Si Composite Anode Material for Lithium Rechargeable Batteries," Electrochemical and Solid-State Letters 2: 547-549 (1999).
Wang et al., "Nanostructured Hybrid Silicon/Carbon Nanotube Heterostructures: Reversible High-Capacity Lithium-Ion Anodes," ACS Nano 4: 2233-2241 (2010).
Wilson et al., "Pyrolysed silicon-containing polymers as high capacity anodes for lithium-ion batteries," Journal of Power Sources 68: 195-200 (1997).
Yokoyama et al., "The Angmill Mechanofusion System and its Applications," Kona 5: 59-68 (1987).
Yokoyama et al., "Ultra-Fine Grinding and Consequent Changes of Powder Characteristics," Kona 1: 53-63 (1983).
Yoshio et al., "Carbon-Coated Si as a Lithium-Ion Battery Anode Material," Journal of The Electrochemical Society 149: A1598-A1603 (2002).
Zuo et al., "Silicon based lithium-ion battery anodes: A chronicle perspective review," Nano Energy 31: 113-143 (2017).
Huang, Xiaoyu, et al. "Microstructure, mechanical properties and strenghening mechanisms of in-situ prepared (Ti5Si3+ TiC0.67)/TC4 composite." Journal of Alloys and Compounds 792 (2019): 907-917. (Year: 2019).
Qian, Lingzhi, et al., "Two-step ball-milling synthesis of a Si/SiO X/C composite electrode for lithium ion battereies with excellent

(56) References Cited

OTHER PUBLICATIONS long-term cycling stability." RSC advances 7.58 (2017): 36697-36704 (Year: 2017).

* cited by examiner

ELECTROCHEMICALLY ACTIVE DISPERSIONS AND COMPOSITES FOR RECHARGEABLE BATTERY ANODES

CROSS-REFERENCE TO RELATED APPLICATIONS

This application is a 371 national-stage application of International PCT Application No. PCT/US2019/064956, filed Dec. 6, 2019, which claims priority to U.S. Provisional Patent Application No. 62/782,008, filed Dec. 19, 2018, all of which are incorporated herein by reference in their entirety.

TECHNICAL FIELD

The present invention pertains to particulate dispersions and composites of graphite and alloy particles containing electrochemically active and inactive phases, methods of making these dispersions and composites, lithium insertion anodes, and rechargeable lithium batteries comprising such anodes. In particular, the invention pertains to particulate dispersions and composites comprising silicon alloy particles and graphite which provide for improved anode performance in lithium batteries.

BACKGROUND

The development of rechargeable high energy density batteries, such as Li-ion batteries, is of great technological importance. Commercial rechargeable batteries that use a lithium transition metal oxide cathode and a graphite anode are approaching their energy density limit (see C. Liu, F. Li, L.-P. Ma and H.-M. Cheng, *Adv. Mater.*, 2010, 22, E28-E62 or R. Marom, S. F. Amalraj, N. Leifer, D. Jacob and D. Aurbach, *J. Mater. Chem.*, 2011, 21, 9938-9954).

In order to enhance the performance of such batteries, the use of silicon-based negative electrode materials has been widely studied because of silicon's high theoretical capacity (3579 mAh/g or 2194 Ah/L; see M. N. Obrovac and V. L. Chevrier, *Chem. Rev.*, 2014, 114, 11444-11502). However, the use of pure silicon is hampered by its large volume expansion (280%) during lithiation (e.g. M. N. Obrovac, L. Christensen, D. B. Le and J. R. Dahn, *J. Electrochem. Soc.*, 2007, 154, A849). The stresses produced by volume changes during charge/discharge cycling lead to structural modifications, particle fracture and damage to the solid-electrolyte interphase (see M. N. Obrovac and V. L. Chevrier, Alloy Negative Electrodes for Li-Ion Batteries, Chem. Rev., 114 (2014), 11444. DOI: 10.1021/cr500207g), resulting in cell capacity fade and hence low cycle life.

The cycle life of batteries employing Si-based anodes can be improved by reducing volume expansion and avoiding the formation of $Li_{15}Si_4$ phase during cycling by, for example, alloying Si with a transition metal to form Si/metal silicide active/inactive alloys. Incorporating oxygen in such alloys can also be beneficial in this regard (as disclosed in U.S. Pat. Nos. 10,050,260 and 8,753,545). Such alloys are most effective when the Si grain size is below 50 nm, which can result in full $Li_{15}Si_4$ phase suppression during cycling. However, SEI disruption because of volume expansion can still result in capacity fade. In another approach, SEI disruption can be reduced when Si containing phases are encapsulated, in order to protect the surface of the Si containing phase from contacting the electrolyte. For example WO2013155397 describes a composite which may contain Si particles, metal particles and graphite formed by milling this mixture with a polymer as a carbon source and heating below 1000° C. to decompose the polymer. However, the active material is pure Si, which tends to form $Li_{15}Si_4$ and have excessive volume expansion. In addition, polymers form amorphous carbon or poorly crystalline graphite that has high irreversible and low reversible capacity when heated to temperatures below about 2600° C. U.S. Pat. No. 9,859,553B2 describes similar electrode materials, excepting the active material is $SiO_x$ and the carbon source is pitch, which again forms amorphous carbon or poorly crystalline graphite during heating. U.S. Pat. No. 9,029,016 describes the use of Si nanoparticles as small as 1 nm in composites containing graphite. However, Si nanoparticles typically have high irreversible capacities due to their large surface oxide content and also still suffer from $Li_{15}Si_4$ formation (see Vincent L. Chevrier, et al., J. Electrochem. Soc., 161 (2014) A783).

Si—C composite materials have been widely investigated (e.g. H. Li, *Electrochem. Solid-State Lett.*, 1999, 2, 547, A. M. Wilson, G. Zank, K. Eguchi, W. Xing and J. R. Dahn, *J. Power Sources*, 1997, 68, 195-200, M. Yoshio, H. Wang, K. Fukuda, T. Umeno, N. Dimov and Z. Ogumi, *J. Electrochem. Soc.*, 2002, 149, A1598, L. Cui, Y. Yang, C. Hsu and Y. Cui, *Nano Lett.*, 2009, 9 No. 9, 1-5, and S. H. Ng, J. Wang, D. Wexler, K. Konstantinov, Z. P. Guo and H. K. Liu, *Angew. Chemie—Int. Ed.*, 2006, 45, 6896-6899). In particular, materials have been investigated in which nanometer Si (n-Si) grains are totally encased in a carbon matrix (e.g. N. Liu, Z. Lu, J. Zhao, M. T. McDowell, H.-W. Lee, W. Zhao and Y. Cui, *Nat. Nanotechnol.*, 2014, 9, 187-192). In these materials the Si is nano-sized to reduce fracturing and the carbon matrix serves to reduce/eliminate volume expansion and to protect the Si phase from exposure to the electrolyte. Such materials have been made by templating methods involving the use of HF/NaOH to remove the template (see for example the aforementioned N. Liu et al. paper, D. Lin, Z. Lu, P. C. Hsu, H. R. Lee, N. Liu, J. Zhao, H. Wang, C. Liu and Y. Cui, *Energy Environ. Sci.*, 2015, 8, 2371-2376, and Y. Park, N. S. Choi, S. Park, S. H. Woo, S. Sim, B. Y. Jang, S. M. Oh, S. Park, J. Cho and K. T. Lee, *Adv. Energy Mater.*, 2013, 3, 206-212), pyrolysis (e.g. Q. Si, K. Hanai, N. Imanishi, M. Kubo, A. Hirano, Y. Takeda and O. Yamamoto, *J. Power Sources*, 2009, 189, 761-765), thermal vapor deposition (the aforementioned M. Yoshio et al. paper or N. Dimov, K. Fukuda, T. Umeno, S. Kugino and M. Yoshio, *J. Power Sources*, 2003, 114, 88-95), chemical vapor deposition (see W.-R. Liu, J.-H. Wang, H.-C. Wu, D.-T. Shieh, M.-H. Yang and N.-L. Wu, *J. Electrochem. Soc.*, 2005, 152, A1719 or W. Wang and P. N. Kumta, *ACS Nano*, 2010, 4, 2233-2241), etc. However, most of these synthesis methods are either too expensive or too difficult to employ in industrial manufacturing.

It has been found that the cycling performance of batteries with anodes comprising alloy particles is enhanced when the alloy particles are dispersed with graphite particles. For instance, Du et al. (Zhijia Du, R. A. Dunlap, and M. N. Obrovac, *J. Electrochem. Soc*, 2014, 161, A1698-A1705) found that the cycling performance of calendered anodes comprising alloy particles improved drastically when the alloy particles were dispersed with graphite particles by planetary milling during electrode preparation. The cycling performance improved for electrodes in which the alloy particles were more disperse. However, according to the SEM images shown by Du et al., the majority of the alloy particles were in the form of secondary particles, which limited the amount of dispersion that could be achieved by this method.

Physical methods that employ dry processing are environmentally friendly and advantageous for industrial use because of the elimination of the use of solvents. The mechanofusion (MF) process was developed in Japan in the mid-1980s and is based on using a high shear field to spheronize or dry-coat powders without using any liquids (see T. Yokoyania, K. Urayama and T. Yokoyama, *KONA Powder Part. J.*, 1983, 1, 53-63). In the Li-ion battery field, MF is commonly used to spheronize natural graphite for use in negative electrodes (e.g. U.S. Pat. No. 9,142,832 or U.S. patent application Ser. No. 14/431,398).

Despite its usefulness in industry, MF has rarely been published in the literature. One reason for this may be because the parameters for the use of MF equipment are not widely known. Nonetheless, several publications describe particles that have been spheronized or coated with another phase by the MF method (e.g. M. Naito, M. Yoshikawa, T. Tanaka and A. Kondo, *KONA Powder Part. J.*, 1993, 11, 229-234, N. Product and M. Features, 1999, 17, 244-250, M. Alonso, M. Satoh and K. Miyanami, *Powder Technol.*, 1989, 59, 45-52, M. Naito, A. Kondo and T. Yokoyama, *ISIJ Int.*, 1993, 33, 915-924, R. Pfeffer, R. N. Dave, D. Wei and M. Ramlakhan, *Powder Technol.*, 2001, 117, 40-67, W. Chen, R. N. Dave, R. Pfeffer and O. Walton, *Powder Technol.*, 2004, 146, 121-136, and C.-S. Chou, C.-H. Tsou and C.-I. Wang, *Adv. Powder Technol.*, 2008, 19, 383-396). Still, few publications sufficiently describe the conditions under which such engineered particles were made.

Despite the continuing and substantial global effort directed at developing improved materials for use in rechargeable batteries, there remain needs for yet further improvement in materials, in the methods for making, and in the batteries made therewith. The present invention addressed these needs and provides further benefits as disclosed below.

SUMMARY

It has been discovered that dry mechanofusion (MF) processes can effectively synthesize novel particulate dispersions and/or composites comprising desirable electrochemically active alloy particles which are well dispersed amongst graphite particles and/or within the matrix of the graphite particles. In some embodiments, it is possible to verify that the alloy particles are embedded between graphite layers in the matrix, thereby resulting in a novel composite. In other embodiments, it is possible to verify that the alloy particles are dispersed as primary alloy particles (as opposed to agglomerates thereof) amongst the graphite particles, thereby resulting in a novel dispersion. Further, the novel nature of the particulate dispersions and composites of the invention are evidenced by improved results obtained when these are employed in anodes for lithium ion batteries. For instance, when employed in such a manner, without being bound to theory, it is believed that this special structure provides improved electrical connection of the alloy particles in the electrode. In addition, the special structure may provide a way to buffer volume expansion and contraction of the embedded particles during lithiation and delithiation. As a result of this hierarchical arrangement, superior cyclability and rate capability can be achieved when compared to simpler mixtures of the particles with graphite. In particular, silicon-graphite particulate dispersions and composites of the invention are extremely promising negative electrode materials for such batteries.

Specifically, particulate composites of the invention comprise a graphite matrix and alloy particles within the graphite matrix in which the alloy particles comprise an electrochemically active phase and an electrochemically inactive phase. Electrochemically active phase here refers to a capability to electrochemically react or alloy with an alkali or alkaline earth metal (e.g. lithium) at typical anode potentials found in related electrochemical devices (e.g. lithium ion batteries).

In some embodiments, the particulate composites are characterized in that the graphite matrix is essentially absent any non-graphitic carbon, has a graphitic crystalline structure characterized by a $d_{002}$ spacing of less than 3.4Å and a $\{002\}$ x-ray diffraction peak with a FWHM of less than 0.4° as measured using $CuK_\alpha$ radiation, and in that the active phase is amorphous or has an average grain size less than 50 nm, and in that the alloy particles are essentially embedded between layers in the graphite matrix.

In other embodiments, the particulate composites are characterized by having mechanofused an amount of alloy particles with an amount of graphite particles in a mechanofusion system, and thereby dispersing the alloy particles within the graphite matrix.

The active phase in the alloy particles can be one of the metals known for their high capacity for lithiation, e.g. those in the group consisting of Si, Sn, and Al. In particular, the active phase can be Si. The inactive phase in the particulate composite can comprise a metal M where M is one or more of Ti, V, Cr, Mn, Fe, Co, Ni, Cu, Mo, and W. For instance, the inactive phase can be a Si-M intermetallic compound, such as $FeSi_2$. In other embodiments, the alloy particles in the composites may comprise active and inactive phases generally comprising combinations of silicon and oxygen and/or silicon and iron. In an illustrative embodiment appearing in the Examples below, the alloy particles may comprise Si, $SiO_2$, and $FeSi_2$.

Along with the active phase in the particulate composites, the inactive phase present may also desirably be amorphous or have an average grain size less than 50 nm. Further, the alloy particles within the graphite matrix in the particulate composite may be primary alloy particles having an average particle size of less than 1 μm and/or greater than 0.1 μm. The average particle size of the particulate composite itself however may be in the range from 5 to 50 μm and more particularly in the range from 5 to 10 μm. In certain embodiments, the particulate composite may be spherically shaped. Also in certain embodiments, the particulate composite may have a surface area of less than 10 m²/g.

Particulate dispersions of the invention generally comprise graphite particles and alloy particles in which the alloy particles comprise an electrochemically active phase and an electrochemically inactive phase and further are dispersed as primary alloy particles. In these dispersions, greater than half of the alloy particles comprising the dispersion are in the form of free primary alloy particles. The active phase in the dispersions is either amorphous or has an average grain size less than 50 nm. And evidencing their dispersion as primary alloy particles, the primary alloy particles have an average particle size of less than 1 μm.

In some embodiments, the graphite particles in such dispersions have a graphitic crystalline structure characterized by a $d_{002}$ spacing of less than 3.4 Å and a $\{002\}$ x-ray diffraction peak with a FWHM of less than 0.4° as measured using $CuK_\alpha$ radiation.

In some embodiments, such particulate dispersions may comprise primary alloy particles comprising silicon and a transition metal but which are essentially absent aluminum.

Dispersions and composite materials of the invention can be particularly suitable for use as lithium insertion anodes in rechargeable lithium batteries, and particularly lithium ion batteries which comprise a lithium insertion cathode, a lithium cation conducting electrolyte, and a lithium insertion anode. Other variant dispersions and composites of the invention may also be useful in such applications, e.g. use of a carbon coated particulate composite in which a particulate composite of the invention is coated with a carbonaceous material.

The aforementioned particulate dispersions and composites can be made using methods based on inexpensive, environmentally friendly mechanofusion dry processing methods. Generally, such a method comprises the steps of obtaining an amount of alloy particles comprising the active phase and the inactive phase, obtaining an amount of graphite particles, and mechanofusing the alloy particles comprising the active phase and the inactive phase with the graphite particles in a mechanofusion system. The mechanofusing step serves to highly disperse the alloy particles in a novel manner as primary alloy particles amongst the graphite particles or within the graphite matrix, thereby resulting in improved characteristics in the product dispersion and/or composite. In some embodiments, performing the mechanofusing for a sufficient time can result in composites in which the alloy particles are essentially embedded between layers in the graphite particles, thereby forming a composite material.

In the method, various graphite types may be contemplated for use including spherical graphite particles or graphite flake particles. Various weight ratios of the obtained alloy particles comprising the active phase and the inactive phase to that of the obtained graphite particles may also be contemplated. For instance, the following examples demonstrate that successful embodiments can be made using a weight ratio of about 1:4.

In relevant embodiments, the mechanofusing may need to be performed until the surface area of the mechanofused alloy particles is less than that of the obtained alloy particles comprising the active phase and the inactive phase plus that of the obtained graphite particles prior to mechanofusing. In exemplary embodiments, mechanofusing times of greater than 30 minutes have proved to be sufficient.

A mechanofusion system suitable for use in the inventive method can comprise a chamber, a rotating wall within the chamber, a scraper within the rotating wall, and a press-head within the rotating wall. A representative gap between the scraper and the rotating wall may be about 0.5 mm. A representative gap between the press-head and the rotating wall may be about 1.4 mm. And a representative speed for rotating the rotating wall may be about 2500 rpm.

BRIEF DESCRIPTION OF THE DRAWINGS

In FIG. 3b, a secondary alloy particle is delineated by a white boundary and some of the primary alloy particles that comprise the secondary particle are pointed out by white arrows.

DETAILED DESCRIPTION

Figure 1:
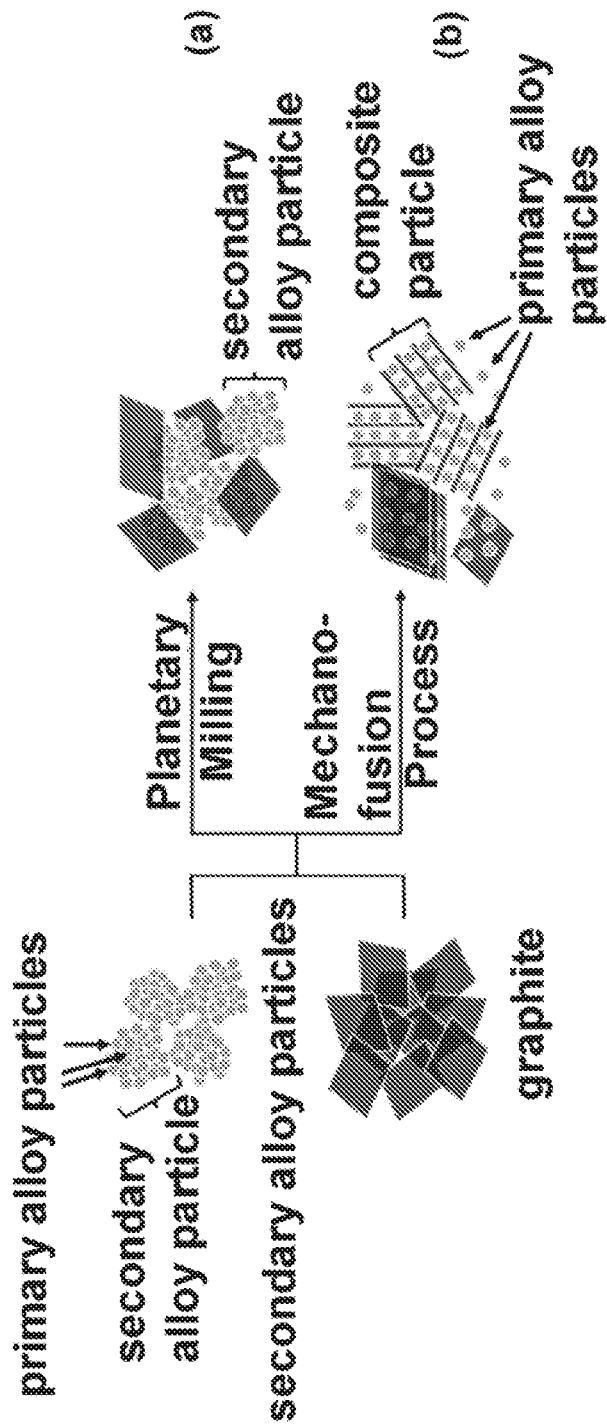
FIGS. 1a and 1b show schematic illustrations of silicon alloy-graphite materials of the prior art and mechanofusion dry processed silicon alloy-graphite materials of the invention.

Unless the context requires otherwise, throughout this specification and claims, the words "comprise", "comprising" and the like are to be construed in an open, inclusive sense. The words "a", "an", and the like are to be considered as meaning at least one and are not limited to just one.

In addition, the following definitions are to be applied throughout the specification:

Herein, the term "domain" refers to the volume occupied by a continuous single solid phase. A domain may be in the form of the volume occupied by a continuous single amorphous phase or the volume occupied by a continuous single crystalline phase (i.e. the volume occupied by a grain or crystallite).

Adjacent domains are separated by phase boundaries or grain boundaries.

The term "graphite matrix" refers to graphitic material having a contiguous graphitic structure throughout its volume.

The term "phase" has its conventional general meaning, namely being a distinct and homogeneous form of matter separated at its surface from other forms of matter.

Herein, the term "electrochemically active phase" or "active phase" refers to a phase that can electrochemically react or alloy with an alkali or alkaline earth metal at typical anode potentials in a relevant electrochemical device. Thus, the metals Si, Sn, and Al are electrochemically active phases since they react with lithium in a lithium ion battery at typical anode potentials between 0 V and 2 V versus lithium metal. Conversely, a phase which does not react in such a manner is an "electrochemically inactive phase" or "inactive phase".

The term "average grain size" refers to the grain size of a phase as determined by the Scherrer grain size determination method as described in more detail below.

The term "amorphous" refers to a phase having no definable grain size or having an average grain size of less than 20 Å as determined by the Scherrer grain size determination method as described in more detail below.

The term "alloy" as used herein refers to a solid substance in which at least 10% by volume of the substance includes phases that consist only of one or more chemical elements that are metals, metalloids, semimetals or semiconductors and in which the substance is homogeneous at a scale of 10 μm.

The term "alloy particles" as used herein refers to particles of an alloy that contains at least one "electrochemically active phase" and at least one "electrochemically inactive phase".

The term "primary alloy particle" refers to an alloy particle composed of one domain or multiple domains that are strongly bonded together. Primary alloy particles cannot be easily broken into smaller constituents by planetary milling or mechanofusion methods.

The term "free primary alloy particle" refers to a lone primary alloy particle that is not form a part of a secondary alloy particle.

The term "secondary alloy particle" refers to an agglomerate of weakly bound primary alloy particles.

The term "anode" refers to the electrode at which oxidation occurs when a metal-ion cell is discharged. In a lithium ion cell, the anode is the electrode that is delithiated during discharge and lithiated during charge.

The term "cathode" refers to the electrode at which reduction occurs when a metal-ion is discharged. In a lithium ion cell, the cathode is the electrode that is lithiated during discharge and delithiated during charge.

The term "metal-ion cell" or "metal-ion battery" refers to alkali metal ion cells, including lithium ion cells and sodium ion cells.

The term "half-cell" refers to a cell that has a working electrode and a metal counter/reference electrode. A lithium half-cell has a working electrode and a lithium metal counter/reference electrode.

The term "active material" refers to a material that can reversibly store metal ions in an anode or cathode.

The terms "anode active material" or "anode material" refer to an active material that is used to reversibly store metal ions in an anode. In a Li-ion cell, anode materials are lithiated during charge and delithiated during discharge at potentials less than 2 V vs. Li. In a Li half-cell, anode materials are delithiated during charge and lithiated during discharge at potentials less than 2 V vs. Li.

The terms "cathode active material" or "cathode material" refer to an active material that is used to reversibly store metal ions in a cathode. In a Li-ion cell, cathode materials are lithiated during discharge and delithiated during charge at potentials greater than 2 V vs. Li. In a Li half-cell, cathode materials are delithiated during charge and lithiated during discharge at potentials greater than 2 V vs. Li.

The term "essentially embedded" refers to the structural relationship between the alloy particles and the graphite matrix in the particulate composites of certain embodiments of the invention. These alloy particles are mainly located and dispersed between layers in the graphite matrix and result in material advantages not seen in prior art composite materials. In practical embodiments of the invention however, not every alloy particle will of course be located between layers in the graphite matrix, nor will every pair of layers in the graphite matrix be characterized by the cited $d_{002}$ spacing. The term is thus intended to capture all these practical embodiments in which the mere presence of some non-embedded particles does not materially affect the basic and novel characteristics of the inventive composite.

In a like manner to the above, the term "essentially absent" in the context of presence of any non-graphitic carbon is intended to include all practical embodiments in which the mere presence of a trace of non-graphitic carbon does not materially affect the characteristics of the composite.

In a quantitative context, the term "about" should be construed as being in the range up to plus 10% and down to minus 10%.

Particulate dispersions and composites with special structures can be synthesized using a dry mechanofusion process. When employed as electrode material in rechargeable batteries, the special structures can provide for several performance improvements, including improved cycle life and rate capability.

Dispersions of the invention generally comprise graphite particles and alloy particles in which the alloy particles are well dispersed as relatively smaller primary alloy particles, as opposed to larger agglomerates thereof, i.e. secondary alloy particles. These inventive dispersions are distinguished from otherwise compositionally similar seeming dispersions of the prior art by the smaller non-agglomerated nature of the dispersed primary alloy particles. In exemplary embodiments, the primary alloy particles have a dimension of 1 μm or less. In some embodiments, more than 50% of the alloy particles are in the form of free primary alloy particles, in some embodiments more than 80% of the alloy particles are in the form of free primary alloy particles, in exemplary embodiments the alloy particles are essentially all in the form of free primary alloy particles, Composites of the invention comprise a graphite matrix and alloy particles that are dispersed within the graphite matrix. In some embodiments, the alloy particles can be observed to be essentially embedded between layers in the graphite matrix. In some embodiments, alloy particles essentially in the form of primary alloy particles are dispersed within the graphite matrix.

These inventive composites are distinguished from otherwise compositionally similar seeming composites of the prior art by this embedded nature of the alloy particles within the graphite matrix.

The schematic drawings in FIGS. 1a and 1b illustrate the differences between silicon alloy-graphite dispersions and composites of the prior art and those of some embodiments of the present invention. In FIG. 1a, a silicon alloy-graphite material has been prepared by planetary milling. In the schematic of FIG. 1a, primary alloy particles are represented by individual small spheres while secondary alloy particles are represented by larger agglomerates (e.g. 10 or more) of these small spheres. The planetary milling process results in a product consisting of a dispersion of silicon alloy and graphite particles in which the secondary alloy particles have not been efficiently broken up. Further, the secondary alloy particles are generally not embedded between layers of the graphite. On the other hand, in FIG. 1b, a silicon alloy-graphite dispersions and composites have been prepared by a MF process in accordance with the invention. Here, the MF process results in full de-agglomeration of the secondary alloy particles into primary alloy particles and excellent dispersion of the primary alloy particles and graphite. Compaction has occurred in which the silicon alloy particles and graphite particles have been fused together. Here then, the embodiment shown in FIG. 1b depicts a dispersion of primary alloy particles and graphite. As shown, there are essentially no secondary alloy particles (i.e no agglomerates of primary particles. Instead, primary alloy particles are shown either as being well dispersed amongst the graphite particles or as being embedded within the matrix of the graphite particles (the latter being identified in FIG. 1b as a composite particle).

Figure 3A:
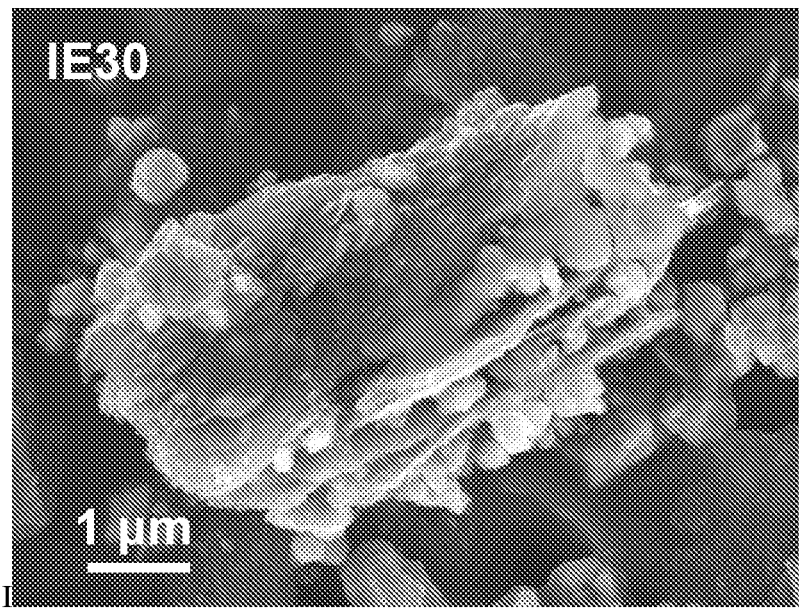
FIGS. 3a and 3b compare SEM images of inventive example IE30 to comparative example CE1 respectively at similar magnification.

The dispersed nature of the alloy particles as primary alloy particles in dispersions of the invention can be confirmed from scanning electron microscopy (SEM) images using secondary electrons for the imaging. For instance, FIGS. 3c and 4d show representative SEM images of inventive dispersions in which the brighter dotted areas represent Si alloy based alloy particles which are evenly dispersed among the graphite particles. Further, SEM imaging can be used to distinguish between secondary alloy particles and such primary alloy particles. Referring to FIG. 1a, secondary alloy particles are in the form of agglomerates of primary alloy particles. Because of their agglomerated nature, secondary alloy particles generally contain void spaces within them. Secondary alloy particles are evident in the representative SEM image of FIG. 3b. Because of their agglomerated character, the primary alloy particles that make up the secondary alloy particles and void spaces within the secondary alloy particles can be easily discerned in SEM images. In the SEM image shown in FIG. 3b, a secondary alloy particle is delineated and a number of primary alloy particles that compose this secondary alloy particle are pointed out. Void spaces are also apparent within this secondary alloy particle. Some of these void spaces have dimensions greater than 100 nm. As shown in FIG. 1a and FIG. 3c, primary alloy particles, in contrast, are composed of phases that are strongly fused together and contain no voids. Because of this, primary alloy particles are much smoother than secondary alloy particles, and void spaces within the primary particles cannot be observed by SEM at a scale larger than 50 nm.

Figure 4A:
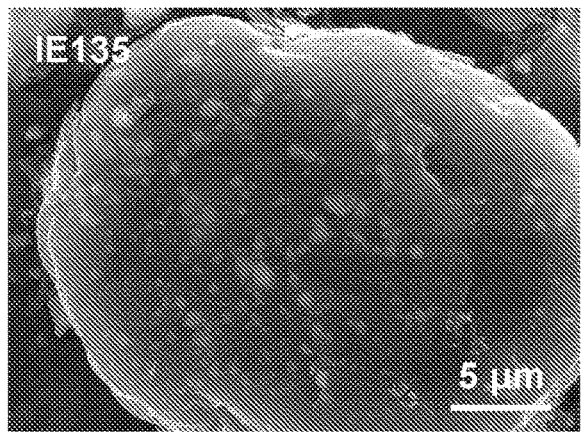
FIGS. 4a and 4b show a SEM image and a cross-sectional SEM image of inventive example IE135 respectively.

The embedded nature of the alloy particles in certain composites of the invention can also be confirmed from scanning electron microscopy (SEM) images using secondary electrons for the imaging. SEM imaging shows alloy particles that may be on the surface of the composite as well as alloy particles that are embedded below the surface. The latter can readily be distinguished from the former in the SEM images, since they are partially obscured by a semitransparent overlayer of graphite. For instance, FIGS. 3a and 4a show representative SEM images of inventive composites in which the brighter dotted areas represent Si alloy based alloy particles below the composite surface and which are clearly embedded and dispersed within the graphite matrix.

Figure 4B:
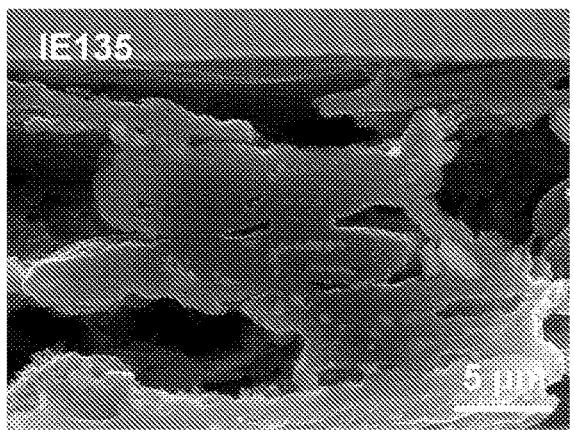

SEM imaging however cannot directly image alloy particles that are more deeply embedded within the graphite matrix. To confirm the embedded nature of alloy particles deep with the particulate composite then, the composite can first be cross-sectioned using ion milling techniques and thereafter similar SEM images obtained to confirm the presence of embedded alloy particles. Ion milling thus allows one to detect alloy particles embedded all the way to the core of the composite. FIG. 4b shows a representative SEM image of an inventive composite that has first been cross-sectioned in such a manner. Again the brighter dotted areas represent Si alloy based particles and it is apparent that the particles were clearly embedded and dispersed deep within the graphite matrix.

In the present invention, the alloy particles comprise both an electrochemically active phase and an electrochemically inactive phase. In an exemplary embodiment intended for applications in lithium ion batteries, the electrochemically active phase can electrochemically react with lithium at anode potentials. Suitable active phases include pure elemental phases C, Mg, Al, Si, Zn, Ga, Ge, Cd, In, Sn, Sb, Pb, Bi and active compounds including and Sn-transition metal alloys. Because of their high capacity for lithium, Si, Sn, and Al may be particularly preferred active phases. Si is a particularly exemplary active phase. In order to obtain the desired structure and hence the properties of the inventive composite, the grain size of the active phase is relatively small (as suggested in FIG. 1b) and is thus either amorphous or has an average grain size of less than 50 nm as determined by X-ray diffraction.

In some embodiments, the inactive phase within the alloy particles may be formed after the charge process or the discharge process in a metal-ion battery. In some embodiments the alloy particles may contain $SiO_x$ or Si and $SiO_2$ phases. When such alloy particles are used as an anode active material in a Li-ion cell, $SiO_x$ or Si and $SiO_2$ phases within the alloy particles may react with lithium to form an alloy particle comprising an active Si phase and an inactive $Li_4SiO_4$ phase after one charge/discharge cycle. In some embodiments, the alloy particles may contain Sn-M phases, where M is a transition metal, including one or more of Ti, V, Cr, Mn, Fe, Co, Ni, Cu, Mo, and W. When such alloy particles are used as an anode active material in a Li-ion cell, Sn-M phases within the alloy particle may react with lithium to form an alloy particle comprising an active $Li_xSn$ phase and an inactive M phase after one discharge half-cycle.

The electrochemically inactive phase present in the alloy particles can be included for various reasons (e.g. to reduce volume expansion when the active phase electrochemically reacted and/or in the case of Si for instance, to prevent the formation of $Li_{15}Si_4$ phase during lithiation/delithiation cycling). Suitable inactive phases include Si-M intermetallic compounds wherein M is one or more of Ti, V, Cr, Mn, Fe, Co, Ni, Cu, Mo, and W. In the case of Si-based active phases, a particularly suitable inactive phase is $FeSi_2$ as it can provide for significant improvements in anode performance. This is evidenced in the following Examples, where composites comprising Si, $SiO_2$, and $FeSi_2$ show surprisingly improved performance. (As those skilled in the art are aware, it is noted that although $FeSi_2$ is a phase that contains an element, i.e. Si, that is capable of alloying with lithium per se, $FeSi_2$ is completely inactive to lithium electrochemically.)

Exemplary particulate composites and particulate dispersions of the invention may thus have chemical compositions which include silicon and oxygen and/or silicon and iron. The composites and dispersions may also include other species as well, including other carbonaceous species in the alloy particles. In an exemplary embodiment however, the particulate composite can essentially be absent any non-graphitic carbon. In other embodiments, it may be advantageous in some applications to apply a carbonaceous coating thereto.

Structurally, the composites include graphite and/or graphitic material with a graphite matrix having a graphitic crystalline structure characterized by a $d_{002}$ spacing of less than 3.4 Å and a {002} x-ray diffraction peak with a full width half maximum (FWHM) of less than 0.4° as measured using $CuK_\alpha$ radiation. As mentioned, the active phase is amorphous or has an average grain size less than 50 nm. The average grain size is determined by X-ray diffraction techniques, and specifically via the Scherrer grain size determination method. The Scherrer method involves the application of the Scherrer equation to the x-ray diffraction peak FWHM of any one of a phase's x-ray powder diffraction peaks between 20° and 60° 2-theta under incident Cu-Kα1 radiation. A description of the Scherrer equation may be found in "X-ray Diffraction" by B. E. Warren, Dover Publications (1990).

In a like manner to the active phase in the alloy particles, in some embodiments the inactive phase present is also relatively small in order to obtain the desired structure and hence the properties of the inventive composite. Preferably therefore, the inactive phase is also desirably amorphous or has an average grain size less than 50 nm as determined by the Scherrer method.

The alloy particles comprising both phases and which may be embedded within the graphite matrix may have an average particle size of less than 1 μm and/or greater than 0.1 μm. The average particle size of particulate composites themselves however may be in the range from 5 to 50 μm and more particularly in the range from 5 to 10 μm.

Particulate composites of the invention may be spherically shaped, especially if prepared by mechanofusion processes. In exemplary embodiments, the composites may have a surface area of less than 10 m²/g.

It has been discovered that the aforementioned particulate composites and particulate dispersions can readily be made using mechanofusion (MF) dry processing methods. The MF process is relatively simple, inexpensive, and requires no solvents thereby making it potentially attractive for environmentally responsible commercial manufacture. The required steps merely include obtaining a suitable amount of alloy particles comprising the active phase and the inactive phase, obtaining a suitable amount of graphite particles; and mechanofusing these amounts together for a sufficient time to suitably disperse the alloy particles among the graphite particles or within their graphite matrix (for instance, a time sufficient to essentially embed the alloy particles between layers in the graphite particles).

Figure 2:
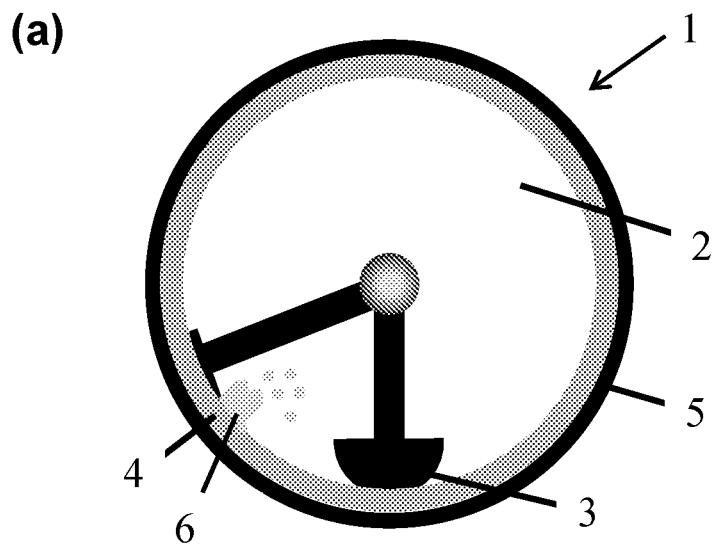
FIG. 2a shows a sketch of an overhead view of the mechanofusion dry process system used to prepare materials in the Examples.
FIG. 2b shows a photograph of an exemplary prepared sample. The circled areas show locations from which the samples were taken.
Figure 2:
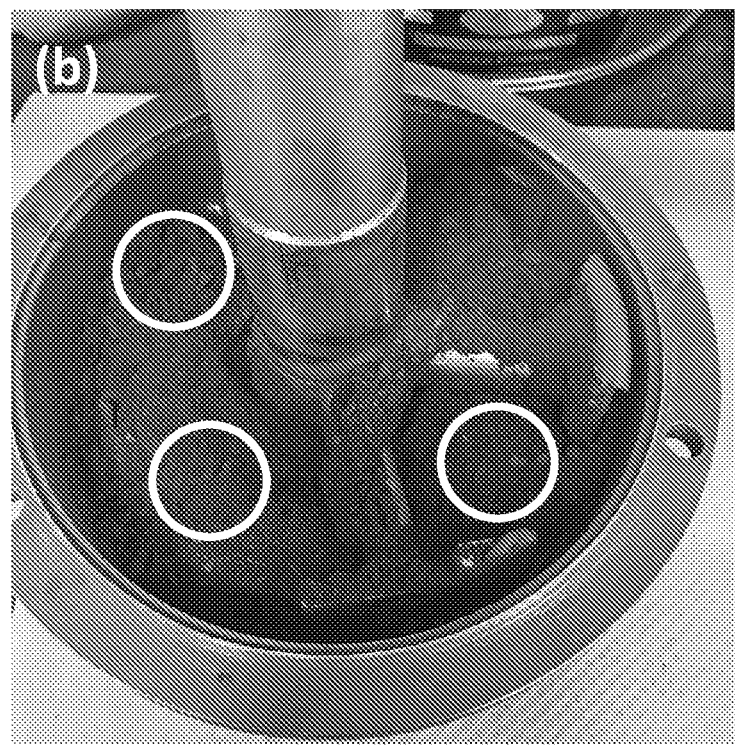

FIG. 2a schematically shows a suitable MF system 1 for preparing composites and dispersions of the invention. It consists of rotating cylindrical chamber 2 in which fixed rounded press-head 3 and fixed scraper 4 are placed. The radius of press-head 3 is smaller than that of chamber 2 and the clearance space between press-head 3 and chamber wall 5 generally ranges from 1 to 5 mm. The clearance between scraper 4 and chamber wall 5 is much smaller, usually around 0.5 mm. Preferably these clearances are adjustable for optimization, depending on factors such as the chamber size, particle size, powder hardness, and so on.

Operation of MF system 1 is simple, but the mechanism by which powder is processed within the chamber is complex (see W. Chen, R. N. Dave, R. Pfeffer and O. Walton, *Powder Technol.*, 2004, 146, 121-136). In use, powder 6 (comprising suitable amounts of alloy particles and graphite) is placed into the chamber and chamber 2 is sealed. When the chamber rotates, powder 6 is forced to chamber wall 5 by centrifugal action. This also forces the alloy particles to pass through the converging space between fixed press-head 3 and rotating chamber wall 5, establishing a high-shear field. As the alloy particles come out of the diverging space of the press-head region, they adhere to each other and to the chamber wall. Scraper 4 serves to scrape off the powder attached to chamber wall 5. The sheared powder mixture is then re-dispersed into the chamber and moves towards the press-head region again. The powder continuously undergoes this process of compression, frictional shearing, and de-agglomeration while chamber 2 is rotating. These interactions result in various effects, including spheronization, the coating of small or soft particles onto large particles, and the embedding of small particles into the large particles. At the high rotation speeds typically utilized (>2000 rpm), these effects occur quickly, typically within minutes.

As those skilled in the art will appreciate, appropriate operating parameters for the MF system can be expected to vary according to the product desired and on the types and amounts of the powder materials employed. It is expected that those of ordinary skill will readily be able to determine appropriate operating parameters for a given situation based on guidance provided in the Examples below. For instance, an indication that processing may be sufficient for some embodiments is when the surface area of the mechanofused particles is less than that of the particle mixture prior to mechanofusing.

Once a suitable supply of particulate material has been prepared for a given application, electrodes and electrochemical devices employing this material may be prepared in numerous manners known to those in the art. For instance, the numerous optional designs and methods for making electrodes for rechargeable lithium batteries as well as the numerous optional designs and methods for making the batteries themselves have been documented extensively in the art. Particularly preferred applications for the present invention are for use as anodes in rechargeable lithium ion batteries.

Without being bound by theory, it is hypothesized that the method of the invention is effective because alloys are often in the form of primary alloy particles that are aggregated into secondary alloy particles. These secondary alloy particles are difficult to separate into primary alloy particles by planetary milling. When incorporated into anodes, the secondary alloy particles may fracture during charging and discharging, resulting in poor cycling. In addition, due to the large overall size of the secondary alloy particles, the absolute volume changes that occur during charging and discharging secondary alloy particles is large, also resulting in poor cycling. Unlike ball milling, mechanofusion however can break up the secondary alloy particles into primary alloy particles and disperse them well with graphite. During charging and discharging, primary alloy particles incorporated in an anode have less tendency to fracture than secondary alloy particles, resulting in improved cycling. In addition, the absolute volume changes that occur during charging and discharging for primary alloy particles are smaller than secondary alloy particles, due to the smaller size of the primary alloy particles, also resulting in improved cycling. Exemplary sizes of primary alloy particles are less than 1 μm or even less than 0.5 μm. In some embodiments of the invention, the mechanofusion process results in the de-agglomeration of the secondary alloy particles into primary alloy particles and furthermore embeds some or essentially all of the primary alloy particles within a graphite matrix. This is further believed to improve cycling by protecting the primary alloy particles from contact with electrolyte.

The following examples are illustrative of certain materials and methods of the invention and demonstrate some of the advantages thereof. However, these examples should not be construed as limiting the invention in any way. Those skilled in the art will readily appreciate that many other variants are possible for the materials and methods disclosed herein.

EXAMPLES

Several exemplary dispersions and composite materials of the invention were prepared using mechanofusion and Si-containing materials comprising both active and inactive phases and certain graphite materials as indicated below. A comparative material was prepared that was compositionally similar but prepared using planetary milling. Electrodes and electrochemical cells were also prepared using these materials. The characteristics of the materials and electrodes were determined and compared along with the cell performance results obtained from the electrochemical cells.

Materials Synthesis

Dispersions and composite materials of the invention were prepared using 100 g (125 mL tapped powder volume) of a 3:1 by volume (81.4:18.6 by weight) mixture of 3M L-20772 Si alloy (hereafter denoted V7, from 3M Co., St. Paul, Minn.) and C-NERGY KS6L graphite (hereafter denoted KS6L from Imerys Graphite and Carbon). The V7 powder comprises domains of electrochemically active Si and electrochemically inactive $SiO_2$, and $FeSi_2$ (e.g. as per WO2016150639A1, page 14) where the Si domains and the inactive domains are less than 15 nm in size and evenly distributed throughout a micron size particle (see Chevrier et al., J. Electrochem. Soc., 161 (2014) A783).

The mixture was dry processed using an AM-15F Mechanofusion System (Hosokawa Micron Corporation, Osaka, Japan). This equipment was modified by replacing the standard stainless steel chamber, scraper, and press head with identical hardened steel parts to reduce wear. A sketch of the modified mechanofusion (MF) system appears in the overhead view of FIG. 2a. MF system 10 comprises chamber 1, rotating wall 2, scraper 3 and press-head 4. The gap between scraper 3 and rotating wall 2 and the gap between press-head 4 and rotating wall 2 are both independently adjustable. FIG. 2b shows a photograph of a representative prepared sample. Samples for characterization and electrode fabrication were taken from the circled areas to obtain better uniformity.

Mechanofusion was conducted at 2500 rpm with a 0.5 mm scraper/wall gap and a 1.4 mm press-head/wall gap. In 15 minute intervals (up to a total of 90 minutes), the MF was stopped, about 1.5 g of sample powder was removed from the chamber, and MF was resumed. These inventive example samples are denoted as IE15, IE30, etc., according to the MF processing time. Samples were collected after a given process time from several different areas in the chamber, as shown in FIG. 2b.

For comparison, a comparative example sample was prepared by planetary milling a mixture of a 1 ml total volume of V7 and KS6L powders at 100 rpm for 1 hour in a 50 mL stainless steel jar in air atmosphere with three 13 mm tungsten carbide balls using a Retsch PM200 planetary mill. The ratio of V7 to KS6L powder was the same as that used to prepare samples IE15 through IE90 above (which were processed by MF). This comparative example sample is denoted CE1 and thus it provides a suitable comparison to the aforementioned inventive examples.

A further material of the invention was then prepared by mixing 10 g of the prepared IE90 sample with an additional 40 g of spherical natural graphite A3901 (from Asbury Carbons), and then processing the mixture in the MF system under the same operating conditions as before for an additional for 45 minutes. This sample is denoted IE135.

A yet further inventive example sample was prepared by mixing 0.4 g of the prepared IE90 with 1.6 g of spherical natural graphite A3901 and milling the mixture in a planetary mill under the aforementioned operating conditions for 1 hour. Here, the ratio of the precursor powders was the same as that used to prepare sample IE135. This inventive example sample was thus prepared using two different procedures, namely a first stage using MF and a second stage using planetary milling. The sample here is denoted IE90*.

A further material of the invention was prepared by treating the IE135 material in a chemical vapor deposition (CVD) system in a fluidized bed at 800° C. for 2 hours under flowing ethylene and 1 hour under flowing argon. This resulted in the deposition of an amorphous carbon layer on all of the particles. This sample is denoted IE135*.

Material Characterization

The specific surface areas of samples were determined by the single-point Brunauer-Emmett-Teller (BET) method using a Micromeritics Flowsorb II2300 surface area analyzer. True sample densities were measured with He gas using a Micromeritics AccuPyc II 1340 gas pycnometer.

Table 1 below summarizes the composition and these physical characteristics of the precursors and materials prepared in these Examples.

TABLE 1

| Material | Composition (wt. %) | | | Method | FWHM (002) degrees 2-theta) | $d_{002}$ (Å) | Density (g/cm³) | BET surface area (m²/g) |
|---|---|---|---|---|---|---|---|---|
| | V7 | KS6L | A3901 | | | | | |
| KS6L | 0 | 100 | 0 | | 0.369 | 3.366 | 2.26 | 19 |
| V7 | 100 | 0 | 0 | | NA | NA | 3.27 | 5.06 |
| A3901 | 0 | 0 | 100 | | 0.252 | 3.371 | 2.26 | 4.33 |
| CE1 | 81.4 | 18.6 | 0 | Planetary Mill 60 min | 0.21 | 3.360 | 3.10 | 8.8 |
| IE15 | 81.4 | 18.6 | 0 | Mechanofusion (MF) 15 min | NA | NA | 3.19 | 16.7 |
| IE30 | 81.4 | 18.6 | 0 | MF 30 min | 0.21 | 3.347 | 3.23 | 15 |
| IE45 | 81.4 | 18.6 | 0 | MF 45 min | NA | NA | 3.21 | 9.8 |
| IE60 | 81.4 | 18.6 | 0 | MF 60 min | NA | NA | 3.22 | 6.7 |
| IE75 | 81.4 | 18.6 | 0 | MF 75 min | NA | NA | 3.23 | 6.2 |
| IE90 | 81.4 | 18.6 | 0 | MF 90 min | NA | NA | 3.22 | 6.5 |
| IE135 | 58.1 | 13.3 | 28.6 | MF of IE90 + A3901 45 min | 0.22 | 3.349 | 2.48 | 6.10 |
| IE90* | 58.1 | 13.3 | 28.6 | Planetary mill of IE90 + A3901 60 min | 0.20 | 3.361 | 2.35 | 6.41 |
| IE135* | 58.1 | 13.3 | 28.6 | MF of IE90 + A3901 45 min + CVD carbon coating | 0.22 | 3.349 | 2.48 | 1.02 |

X-ray diffraction (XRD) patterns of several of the prepared samples were collected using a Rigaku Ultima IV diffractometer equipped with a Cu Kα X-ray source, a diffracted beam graphite monochromator and a scintillation detector. Each XRD pattern was collected from 20° to 90° 2-theta in 0.05° increments for 3 seconds per step.

For inventive example IE30, the full width at half maximum (FWHM) of the (002) XRD peak of graphite here was 0.21° and the graphite $d_{002}$ spacing was determined to be 3.347 Å. No evidence of amorphous carbons was observed by XRD. The average grain size of the active Si phase and the inactive phases was determined to be less than 15 nm in all of the samples using the Scherrer grain size determination method.

For comparative example CE1, the full width at half maximum (FWHM) of the (002) XRD peak of graphite was 0.21° and the graphite $d_{002}$ spacing was determined to be 3.360 Å. Again, no evidence of amorphous carbons was observed by XRD.

For inventive example IE135, the full width at half maximum (FWHM) of the (002) XRD peak of graphite was 0.22° and the graphite $d_{002}$ spacing was determined to be 3.349 Å. No evidence of amorphous carbons was observed by XRD.

For inventive example IE90*, the full width at half maximum (FWHM) of the (002) XRD peak of graphite was 0.20° and the graphite $d_{002}$ spacing was determined to be 3.361 Å. No evidence of amorphous carbons was observed by XRD.

SEM and cross-sectional SEM were used to study sample morphology. In this regard, a TESCAN MIRA 3 LMU Variable Pressure Schottky Field Emission Scanning Electron Microscope (SEM) was used. Cross-sections of sample were prepared with a JEOL Cross-Polisher (JEOL Ltd., Tokyo, Japan) which sections samples by shooting argon ions at them. The cross-sections shown in the following were obtained of particles after having made electrodes therefrom (as discussed later below). Multiple sectioned particles appear in these images.

Figure 3B:
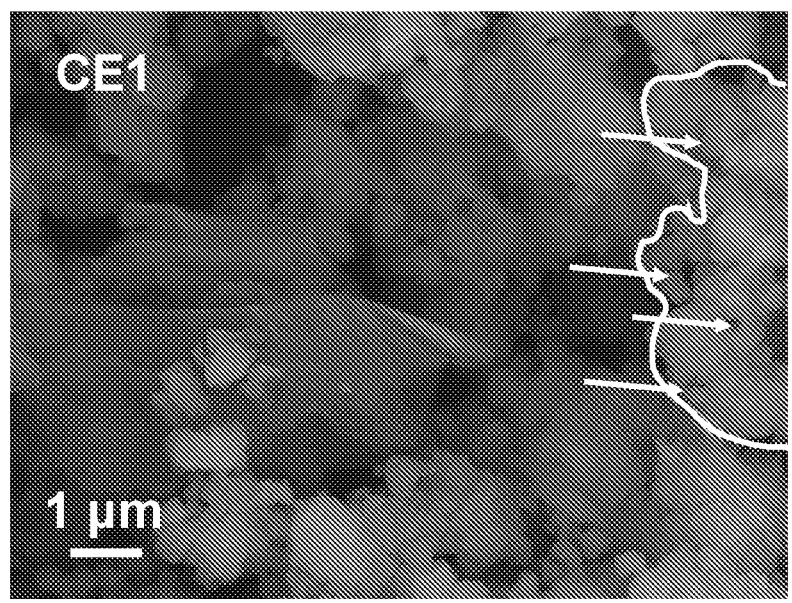
Figure 3C:
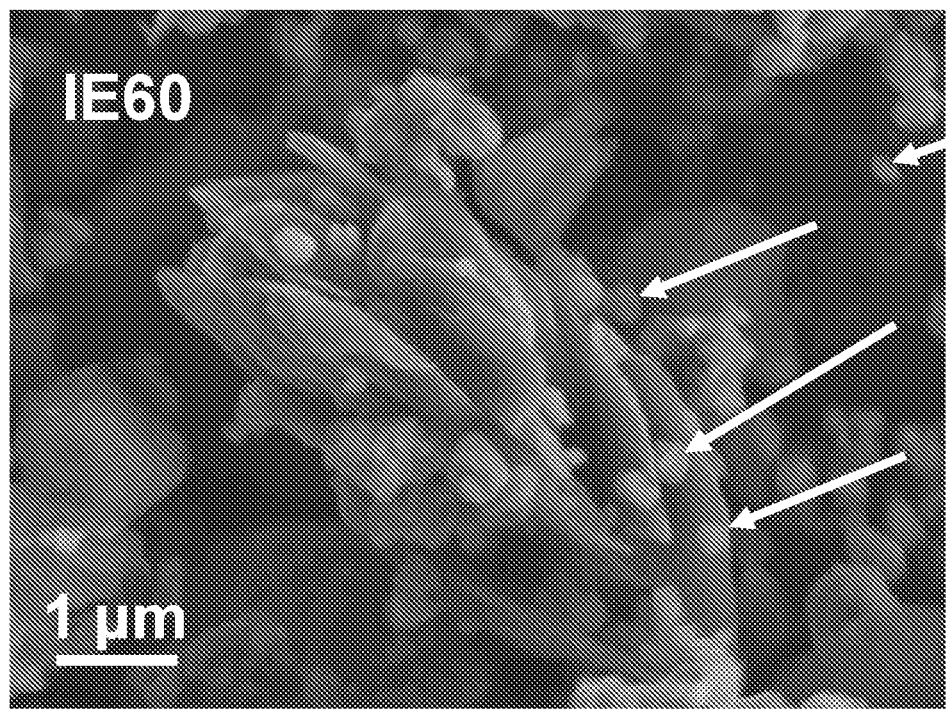
FIG. 3c shows an SEM image of IE60 with white arrows pointing to some primary alloy particles.

FIGS. 3a and 3b compare SEM images of inventive example IE30 to comparative example CE1 respectively at similar magnification. Sample IE30 comprises alloy particles that are essentially in the form of primary alloy particles and is seen to also comprise composite particles that consist of layers of graphite with 0.1-0.5 µm primary alloy particles embedded between the layers. Sample CE1 is seen to consist of a mixture of graphite and alloy particles that are essentially all in the form of secondary alloy particles, in which no particles were observed to comprise graphite layers with alloy particles embedded between them.

FIG. 3c shows an SEM image of IE60. The sample consists of alloy particles that have been effectively deagglomerated into the form of primary alloy particles and dispersed with graphite particles by the mechanofusion process. White arrows in the figure point to some primary alloy particles that are generally 0.1-0.5 µm in size.

Figure 4C:
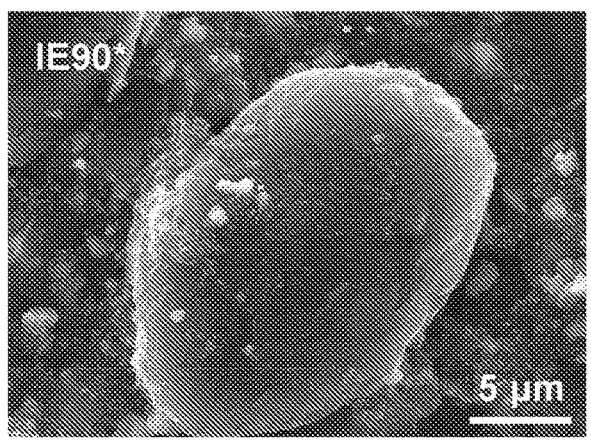
FIGS. 4c and 4d show a SEM image and a cross-sectional SEM image of inventive example IE90*.
Figure 4D:
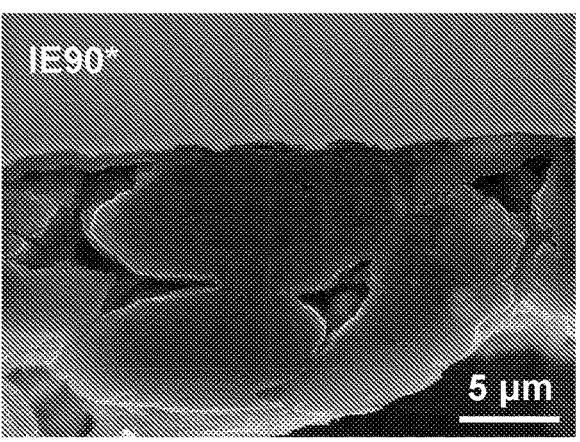

FIGS. 4a and 4b show a SEM image and a cross-sectional SEM image of inventive example IE135 respectively. FIGS. 4c and 4d show a SEM image and a cross-sectional SEM image of inventive example IE90* respectively. Sample IE135 is seen to be comprised of roughly spherical graphite particles with V7 primary alloy particles embedded within the composite particle. In FIG. 4a, the V7 primary alloy particles (the small whitish dots) are visible under the graphite surface. In a like manner, the cross-section in FIG. 4b also shows V7 primary alloy particles embedded between graphite layers in the composite particles. The embedded V7 particles are clearly present from below the surface layer of the composite particle all the way to the core of the composite particle.

On the other hand, sample IE90* seems to be comprised of a mixture of roughly spherical graphite particles with V7 primary alloy particles. As is evident from FIGS. 4c and 4d, all of the visible V7 seems dispersed outside of the graphite particles. No evidence was observed of V7 particles being embedded within the graphite particles.

Other observations are noteworthy in the preceding. For instance, the theoretical density of the physical mixture of V7 and KS6L used in samples IE15 through IE90 is 3.02 g/cm³. However, the measured densities of sample CE1 and the IE15 through IE90 samples are higher than this theoretical value, especially for the latter inventive samples prepared by MF. This suggests that the V7 alloy contains internal porosity which is removed during either the planetary milling or MF processes. From SEM images obtained of the as-received V7 alloy and KS6L graphite, V7 alloy is composed of ~0.5 µm primary alloy particles that are agglomerated to form ~5-50 µm secondary alloy particles. The porosity likely resides between the primary alloy particles. KS6L is composed of graphite flakes around 5 µm in size. The planetary milled CE1 sample consists of a V7 and KS6L mixture in which the V7 alloy particles and KS6L graphite flakes are still agglomerated. By contrast, for the IE30 sample, MF has completely broken down the secondary alloy particles into primary alloy particles and the KS6L graphite into individual flakes. The alloy particles and graphite flakes are dispersed uniformly and compacted together. Some V7 primary alloy particles are embedded between graphite flakes in the IE30 and IE60 samples. This process has removed any void spaces resulting from particle agglomeration, consistent with the observed density increase.

In a like manner, the theoretical BET surface area of the physical mixture of V7 and KS6L used in samples IE15 through IE90 is 7.6 m$^2$/g. After planetary milling and during the initial stages of MF, the surface area of the samples becomes about 17 m$^2$/g, much larger than the theoretical BET surface area of a simple mixture of the components. This appears to be because the MF process breaks down the secondary alloy particles into primary alloy particles, exposing more surface area. However, after 30 minutes of MF, the surface area decreases with further processing time until a steady-state surface area of about 6.7 m$^2$/g is reached, which is less than the theoretical surface area of a simple mixture. This suggests that after the alloy agglomerates have been broken down during the initial stages of MF, compaction occurs, resulting in a reduced surface area. This would agree with previous reports (e.g. in M. Naito, M. Yoshikawa, T. Tanaka and A. Kondo, *KONA Powder Part. J.*, 1993, 11, 229-234) which suggest that MF is a two-step process involving adhering/dispersion and compaction. These results are illustrated schematically in FIGS. 1a and 1b which show planetary milled silicon alloy-graphite materials of the prior art and mechanofusion dry processed silicon alloy-graphite materials of the invention. While planetary milling results in a dispersion of the V7 and KS6L powders, it does not efficiently break up agglomerates. In contrast, MF results in full de-agglomeration and excellent dispersion of the two components. Moreover, compaction occurs in which the V7 alloy particles and flakes have been fused together.

Figure 16:
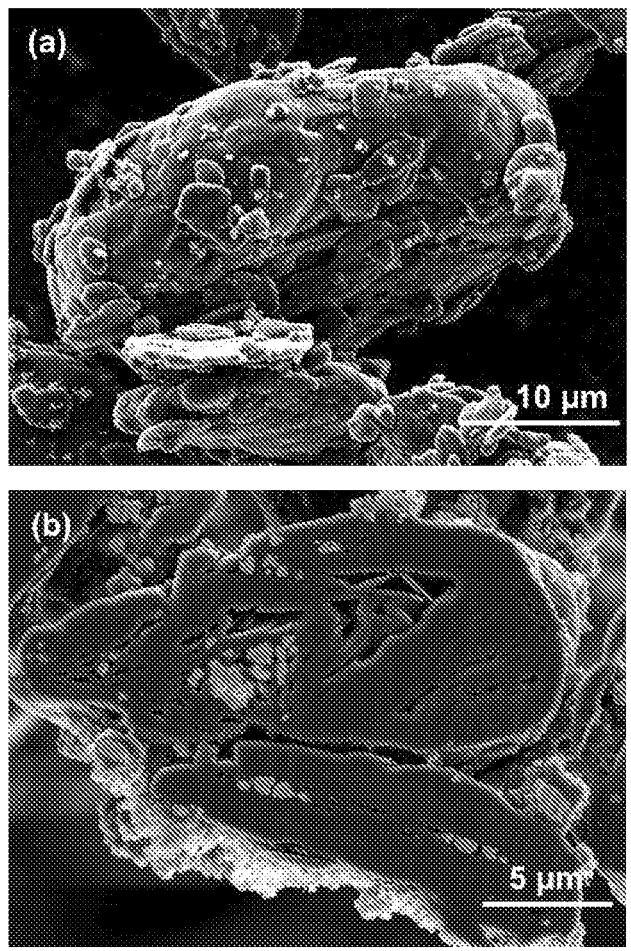
FIGS. 16a and 16b show a SEM image and a cross-sectional SEM image, respectively, of inventive example IE135*.
Figure 17:
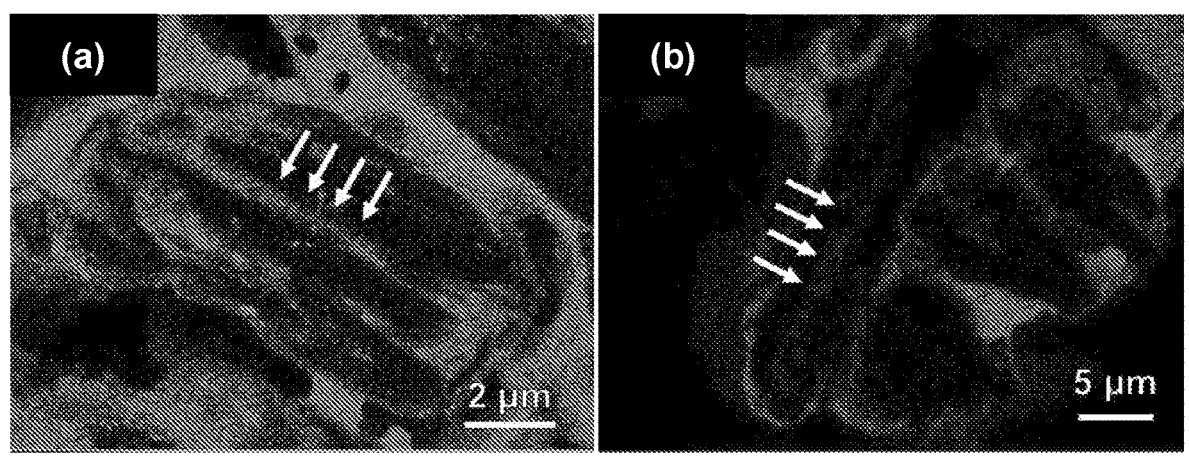
FIGS. 17a and 17b show electron dispersive x-ray mappings of fluorine for cross-sections of IE135 and IE135* particles after soaking in 1 M LiPF6/EC:DEC:FEC=3:6:1 electrolyte for 1 week. Light and dark areas represent the presence and absence of fluorine, respectively. Arrows indicate the position of alloy particles embedded in the interior of the particle and located near the particle core.

FIG. 16a shows an SEM image of IE135*. The surface of the IE135* particles are smoother than those of IE135, indicating uniform carbon deposition. The carbon coating layer of IE135* can be recognized in the cross-sectional SEM image in FIG. 16b as a lighter shade of grey than the darker graphite. The coating covers all surfaces of the particles and is about 150 nm thick. FIGS. 17a and 17b show electron dispersive x-ray mappings of fluorine for cross-sections of IE135 and IE135* particles after soaking in 1 M LiPF6/EC:DEC:FEC=3:6:1 electrolyte for 1 week. Light and dark areas represent the presence and absence of fluorine, respectively. Arrows indicate the position of alloy particles embedded in the interior of the particle and located near the particle core. Here fluorine indicates the presence of electrolyte in the sample. FIG. 17a shows that electrolyte has penetrated the graphite particles, such that the surfaces of the alloy embedded in the graphite have become exposed to electrolyte. In contrast, FIG. 17b shows that electrolyte does not penetrate appreciably into the interior of IE135* particles, as a result of the protective carbon coating layer formed by CVD processing. Thus, the alloy particles in IE135* are protected from reaction with electrolyte, which is thought to be beneficial for cycling performance.

Electrode Preparation

Sample electrodes for laboratory testing were prepared from some of the inventive, comparative, and precursor materials prepared above. In all cases, slurries were prepared by mixing the prepared active alloy particles, carbon black (Super C65, Imerys Graphite and Carbon) and lithium polyacrylate (LiPAA, the LiPAA was provided in a 10 weight % aqueous solution, made by neutralizing a polyacrylic acid solution (Sigma-Aldrich, average molecular weight ~250,000 g/mole, 35 wt % in H$_2$O) with LiOH.H$_2$O (Sigma Aldrich, 98%) in distilled water) in a active particle/carbon black/LiPAA volumetric ratio of 70/5/25 in distilled water. Slurries were mixed for one hour with a Retsch PM200 planetary mill at 100 rpm with three 13 mm tungsten carbide balls and then spread onto copper foil with a 0.004 inch gap coating bar. The coatings were then dried in air for 1 hour at 120° C., cut into 1.3 cm disks and then heated under Ar for 1 hour at 120° C. with no further air exposure. The resulting electrode loadings were ~2-2.5 mg/cm$^2$. Some electrodes were then calendered by passing through an adjustable gap calendar with 6" diameter rolls. All calendered electrodes had a porosity of 35-40%, so that good electrode kinetics could be maintained.

To determine the amount of pressure required to densify single coatings, 2 cm$^2$ circular electrodes were placed into a die and compressed using a Carver 3925 hydraulic press and the electrode thickness was then measured as a function of the applied pressure. Electrode thicknesses were measured to within ±1 µm with a Mitutoyo 293-340 precision micrometer. The coating volume was then determined by subtracting the thickness of the Cu current collector and multiplying by the coating area. Electrode porosity was determined by first calculating the solids volume for each of the electrode components, using the densities listed in Table 1. The electrode pore volume was then the difference between the total coating volume minus the solids volume. Porosities are expressed here as percentages of the total coating volume. The volume expansion and density of the lithiated alloys were determined by assuming that lithium occupies 9 mL/mol in the alloy, as described in M. N. Obrovac, L. Christensen, D. B. Le and J. R. Dahn, *J. Electrochem. Soc.*, 2007, 154, A849.

Sample electrodes were thus prepared in either uncalendered (uc) electrodes and calendered (c) electrodes with a porosity of about 38%. SEM images of representative uncalendered and calendered electrodes were then obtained. From SEM images of the uncalendered and calendered neat V7 electrodes, a noticeable reduction in the average particle size was observed after calendering. This effect has been observed previously (see Z. Du, R. A. Dunlap and M. N. Obrovac, *J. Electrochem. Soc.*, 2014, 161, A1698-A1705). It can be attributed to the inability for the hard and irregularly shaped alloy particles to slide past each other during compression. Instead, porosity reduction is only achieved through particle fracture, which exposes fresh alloy surfaces that are not covered with binder. For sample CE1 prepared by planetary milling, segregated regions of silicon alloy and graphite particles were observed in both uncalendered and calendered samples. Similar to the case of the neat V7 electrode, there was a noticeable reduction in average alloy particle size in the segregated alloy regions, indicative of alloy particle fracture. In contrast, the alloy and graphite particles are dispersed more uniformly in the VK electrode prepared by MF, resulting in no apparent reduction in alloy particle size during calendering. This indicates that the well dispersed graphite in the VK sample acts as an effective calendering lubricant, allowing the electrode to compact without particle fracture.

Cell Preparation

To evaluate the various materials as anode materials in Li-ion cells, laboratory test lithium half-cells were constructed and tested. Electrodes were assembled in 2325-type coin lithium half-cells with a lithium foil (99.9%, Sigma Aldrich) counter/reference electrode. (Note: as is well known to those skilled in the art, results from these test lithium half-cells allow for reliable prediction of anode materials performance in lithium ion batteries.) Two layers of Celgard 2300 separator were used in each coin lithium half-cell. 1M $LiPF_6$ (BASF) in a solution of ethylene carbonate, diethyl carbonate and monofluoroethylene carbonate (volume ratio 3:6:1, all from BASF) was used as electrolyte. Cell assembly was carried out in an Ar-filled glove box. Cells were cycled galvanostatically at 30.0±0.1° C. between 0.005 V and 0.9 V using a Maccor Series 4000 Automated Test System at a C/20 rate for the first cycle with a C/40 trickle discharge (lithiation) and a C/5 rate for the following cycles with a C/20 trickle discharge (lithiation). Cells were also cycled at various rates (C/10, C/5, C/2, 1C, 2C, 4C, and C/10) for 10 cycles respectively to test rate capability.

Electrochemical Characterization

FIGS. 5a through 5d show the voltage curves obtained from lithium half-cells comprising uncalendered and calendered electrodes of V7 alloy, the CE1 planetary milled comparative sample, and the IE30 and IE60 mechanofused inventive samples respectively.

FIGS. 6a through 6d show the corresponding differential capacity curves obtained from cells comprising uncalendered electrodes of V7 alloy, the CE1 planetary milled comparative sample, and the IE30 and IE60 mechanofused inventive samples respectively.

FIGS. 7a through 7d show the corresponding differential capacity curves obtained from cells comprising calendered electrodes of V7 alloy, the CE1 planetary milled comparative sample, and the IE30 and IE60 mechanofused inventive samples respectively.

Figure 8A:
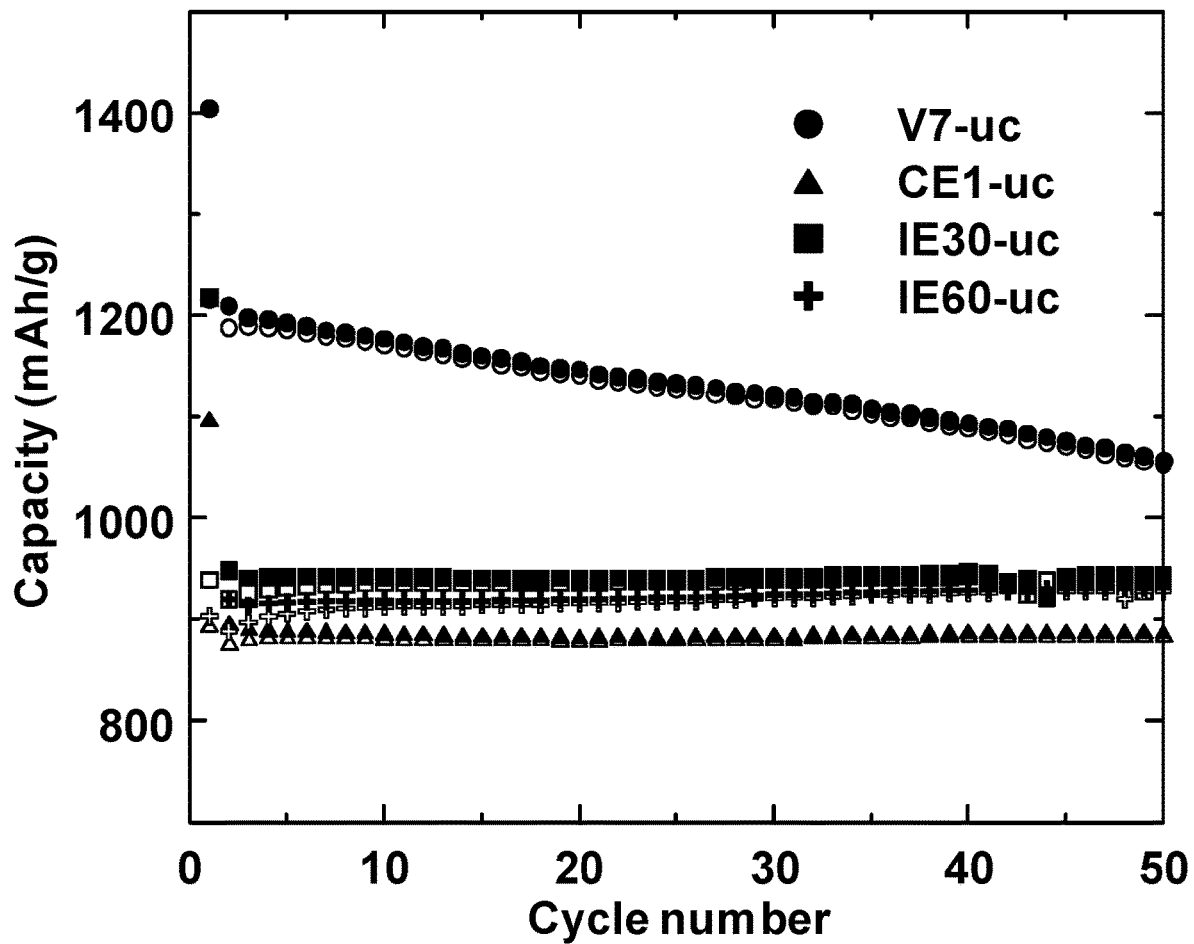
FIGS. 8a through 8d show the electrochemical performance of cells comprising V7 alloy, the CE1 planetary milled comparative sample, and the IE30 and IE60 MF inventive samples. Cycling performance of the uncalendered electrodes is shown in FIG. 8a. Cycling performance of the calendered electrodes is shown in FIG. 8b. The coulombic efficiency of the uncalendered electrodes is shown in FIG. 8c. The coulombic efficiency of the calendered electrodes is shown in FIG. 8d.
Figure 8B:
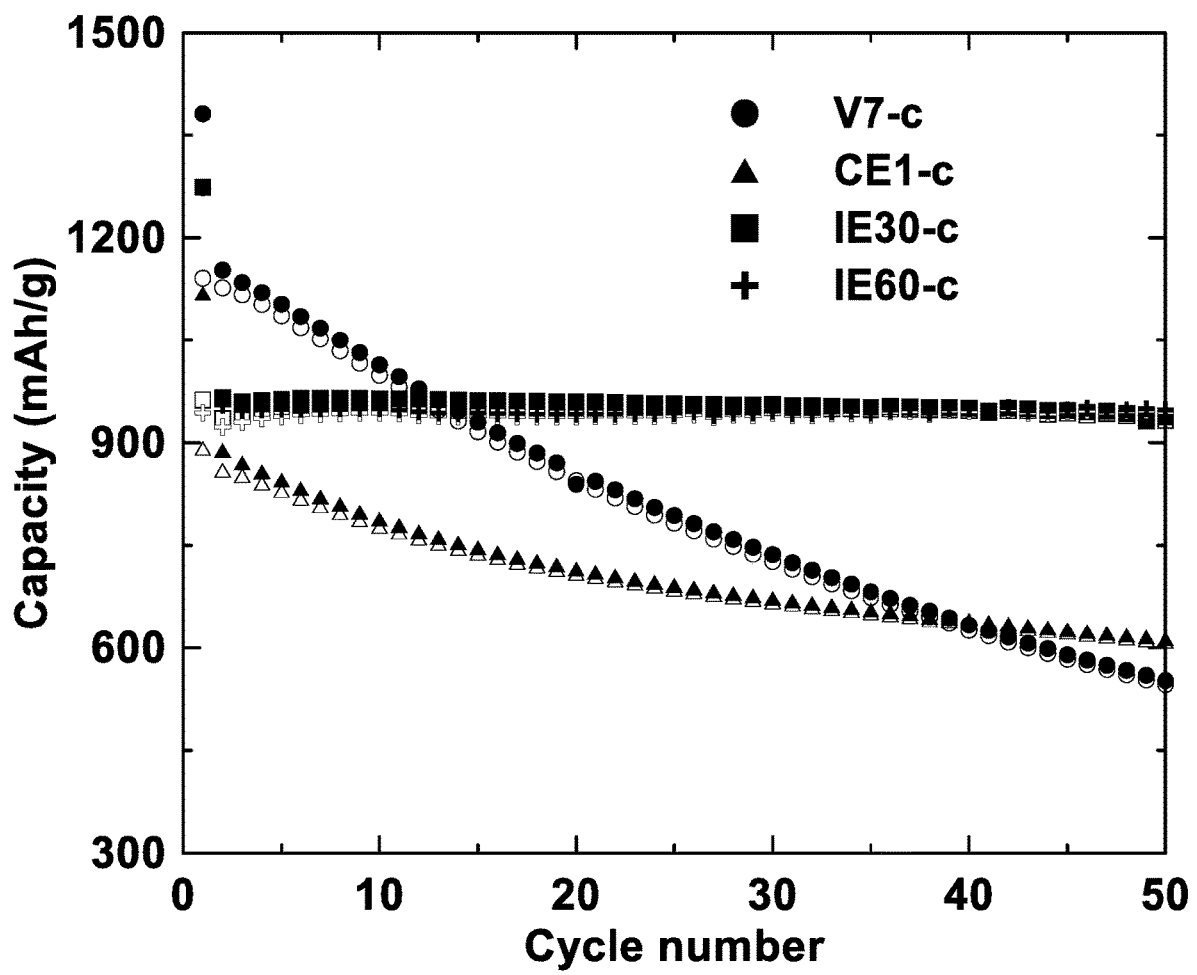
Figure 8C:
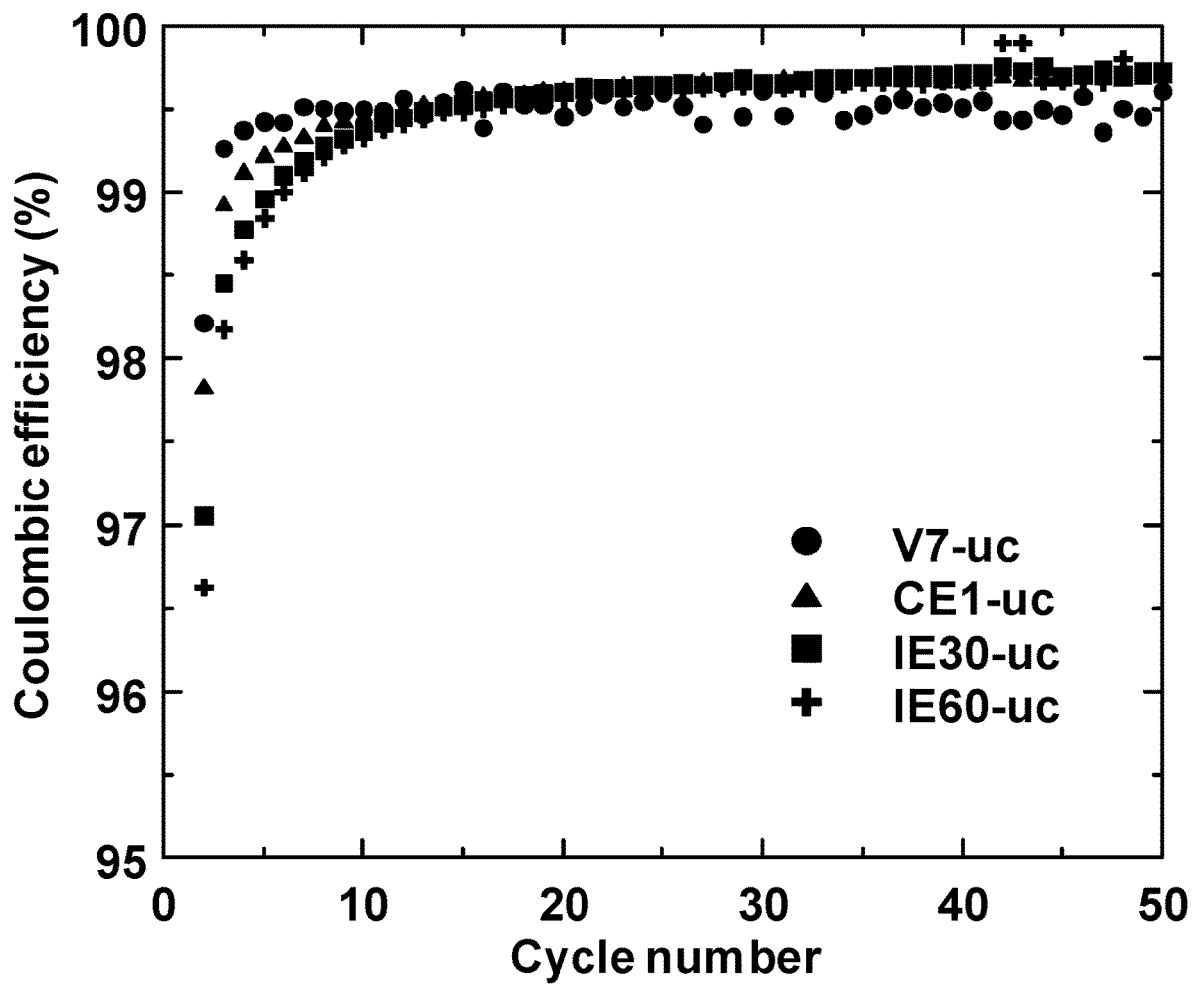
Figure 8D:
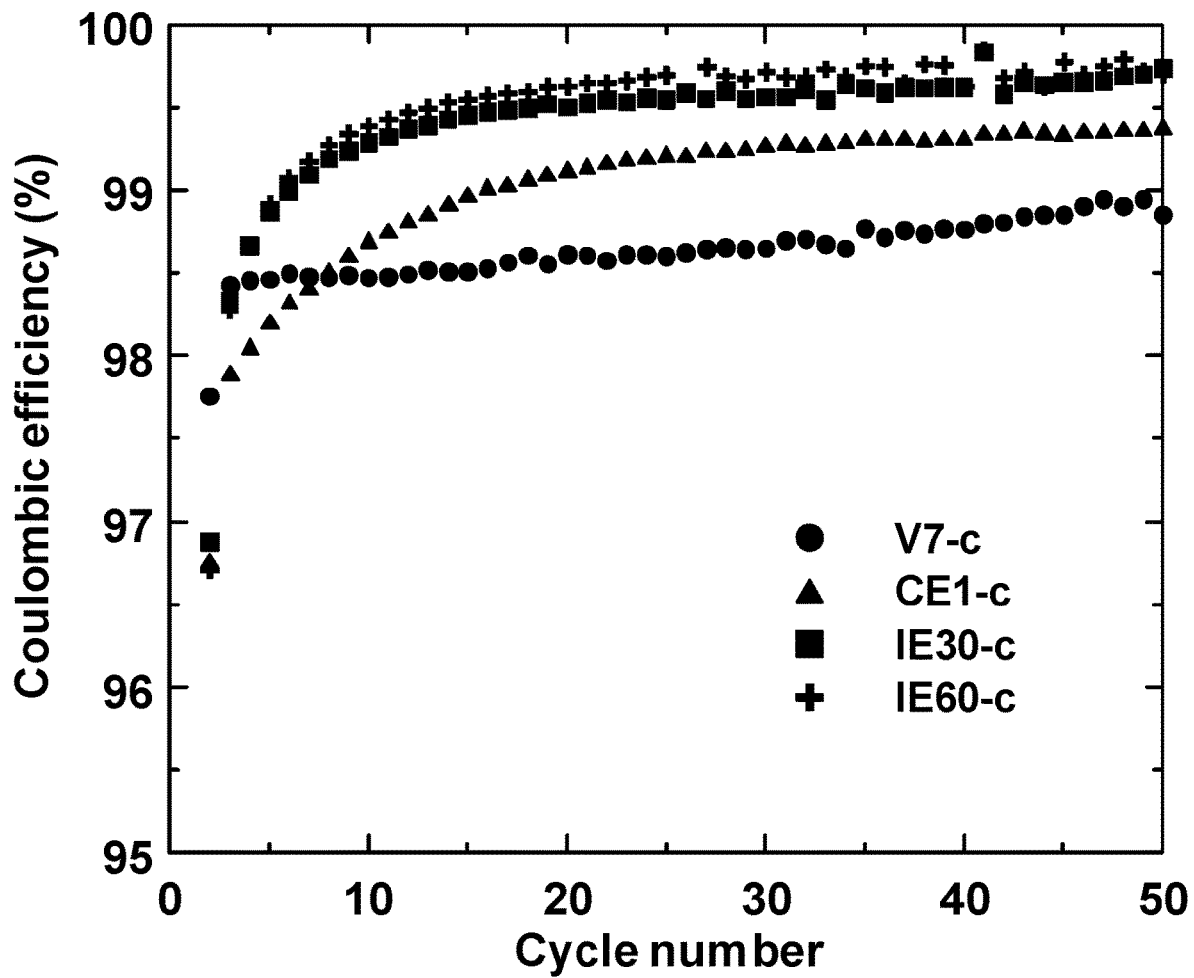

FIGS. 8a through 8d show the electrochemical performance of cells comprising V7 alloy, the CE1 planetary milled comparative sample, and the IE30 and IE60 MF inventive samples. Cycling performance of the uncalendered electrodes is shown in FIG. 8a. Closed symbols indicate lithiation capacity and open symbols indicate delithiation capacity. Cycling performance of the calendered electrodes is shown in FIG. 8b. The coulombic efficiency of the uncalendered electrodes is shown in FIG. 8c. The coulombic efficiency of the calendered electrodes is shown in FIG. 8d.

Figure 9:
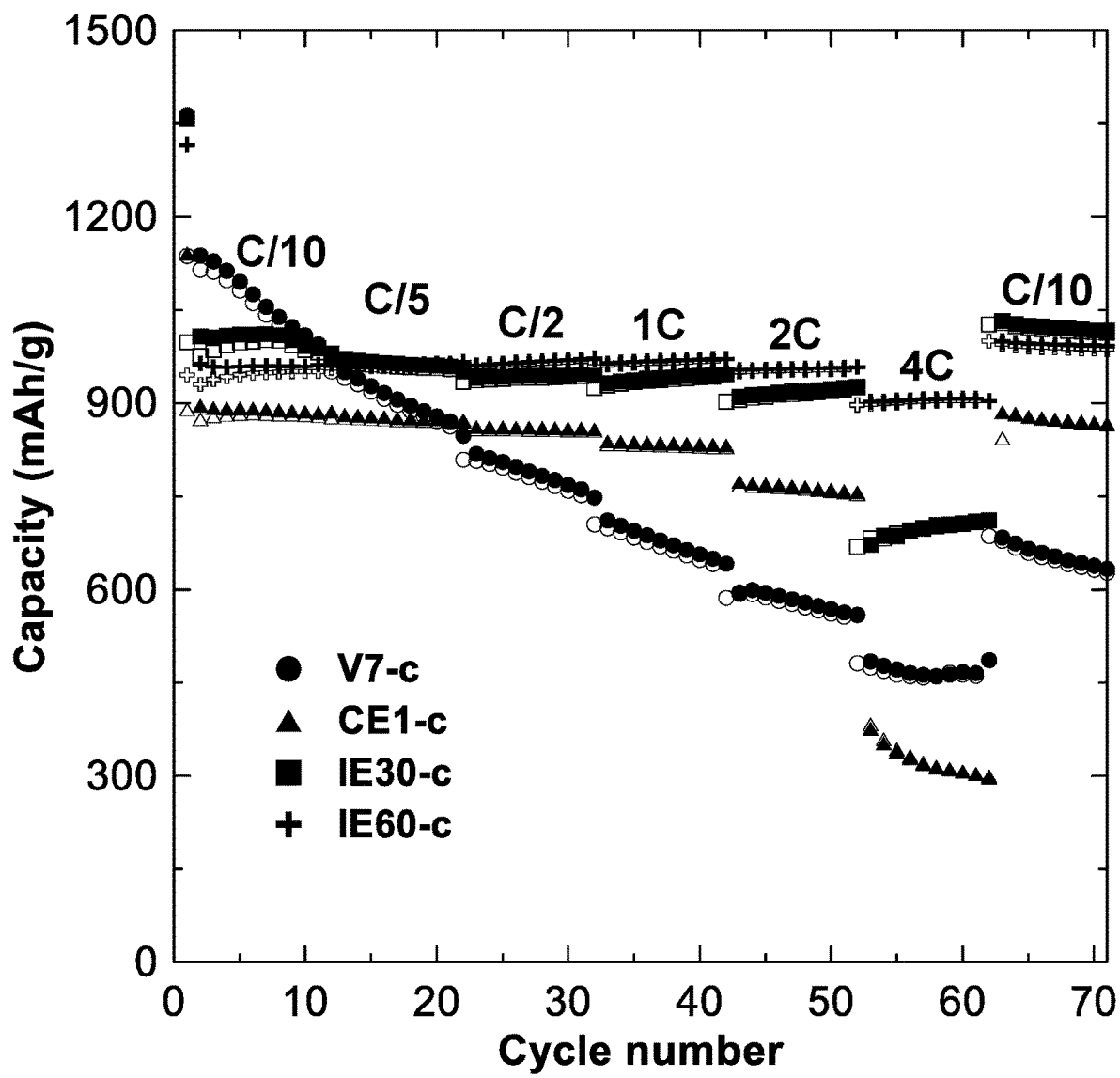
FIG. 9 shows the rate capability of cells comprising calendered electrodes of V7 alloy, the CE1 planetary milled comparative sample, and the IE30 and IE60 MF inventive samples.

FIG. 9 shows the rate capability of cells comprising calendered electrodes of V7 alloy, the CE1 planetary milled comparative sample, and the IE30 and IE60 MF inventive samples.

Figure 10:
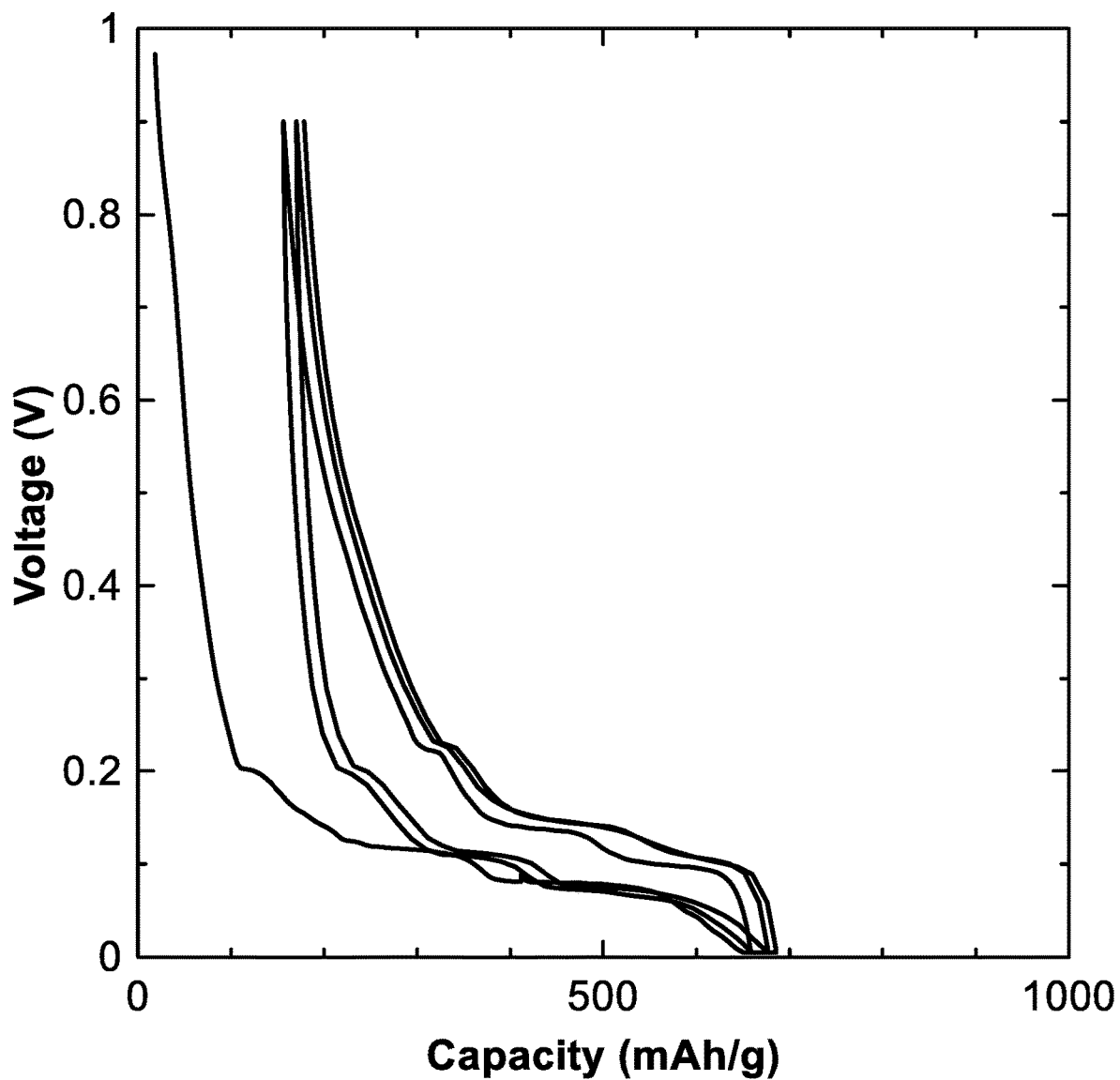
FIG. 10 shows the voltage curve obtained from a cell comprising uncalendered IE135 inventive sample.

FIG. 10 shows the voltage curve obtained from a cell comprising uncalendered IE135 inventive sample.

Figure 11:
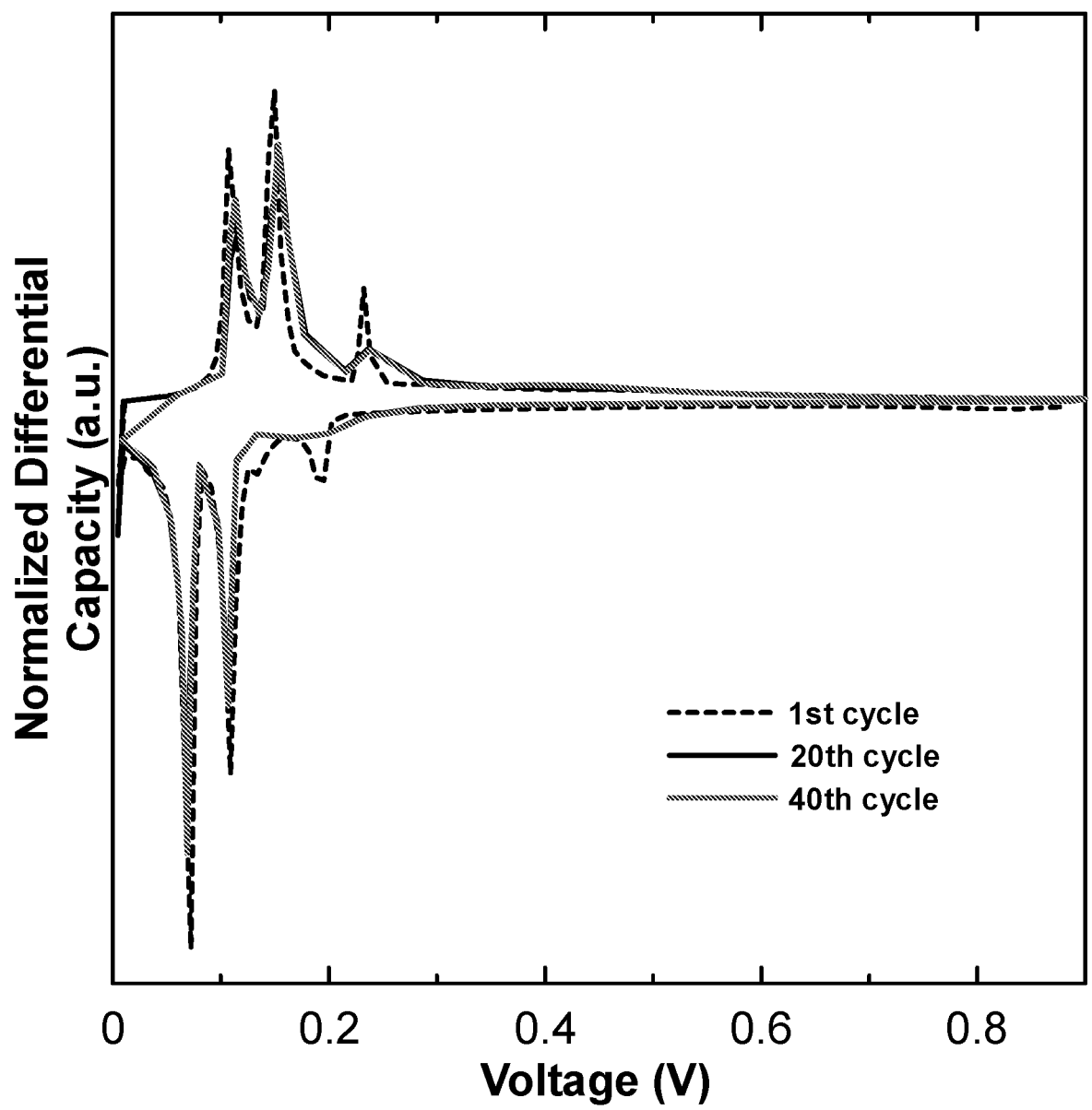
FIG. 11 shows the corresponding differential capacity curve obtained from a cell comprising uncalendered IE135 inventive sample.

FIG. 11 shows the corresponding differential capacity curve obtained from a cell comprising uncalendered IE135 inventive sample.

Figure 12:
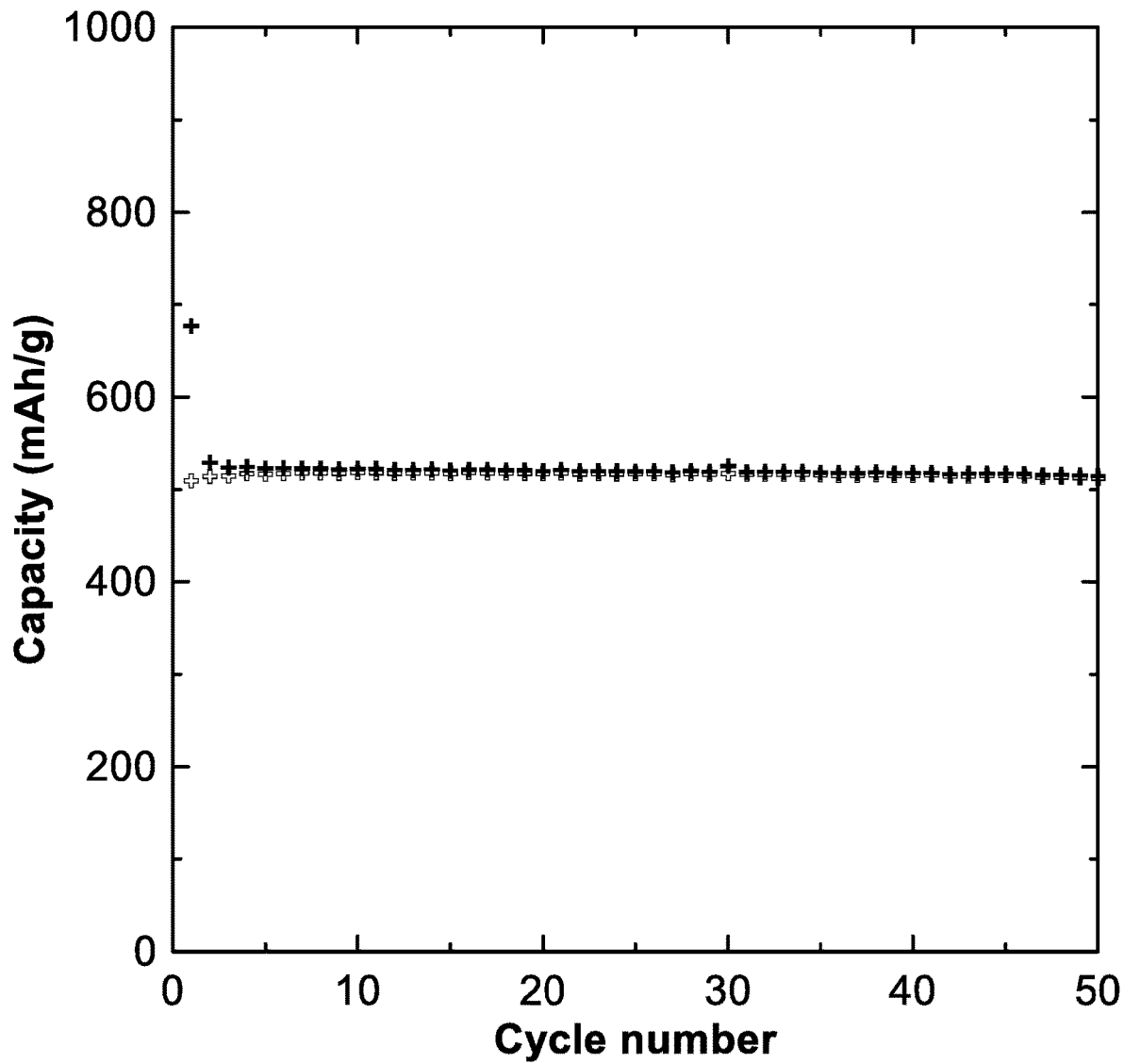
FIG. 12 shows the cycling performance of a cell comprising uncalendered IE135 inventive sample.

FIG. 12 shows the cycling performance of a cell comprising uncalendered IE135 inventive sample. Closed symbols indicate lithiation capacity and open symbols indicate delithiation capacity.

Figure 13:
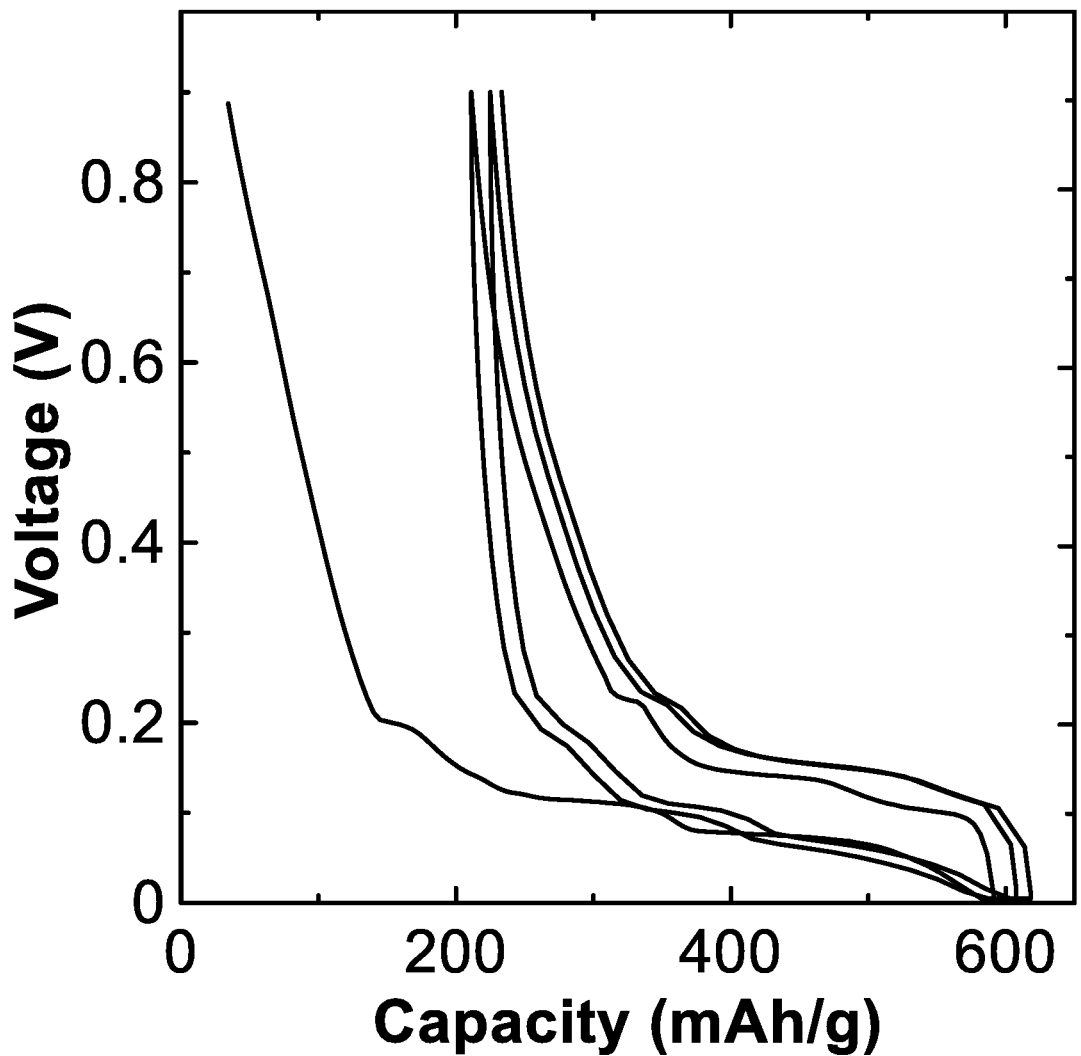
FIG. 13 shows the voltage curve obtained from a cell comprising uncalendered IE90* inventive sample.

FIG. 13 shows the voltage curve obtained from a cell comprising uncalendered IE90* inventive sample.

Figure 14:
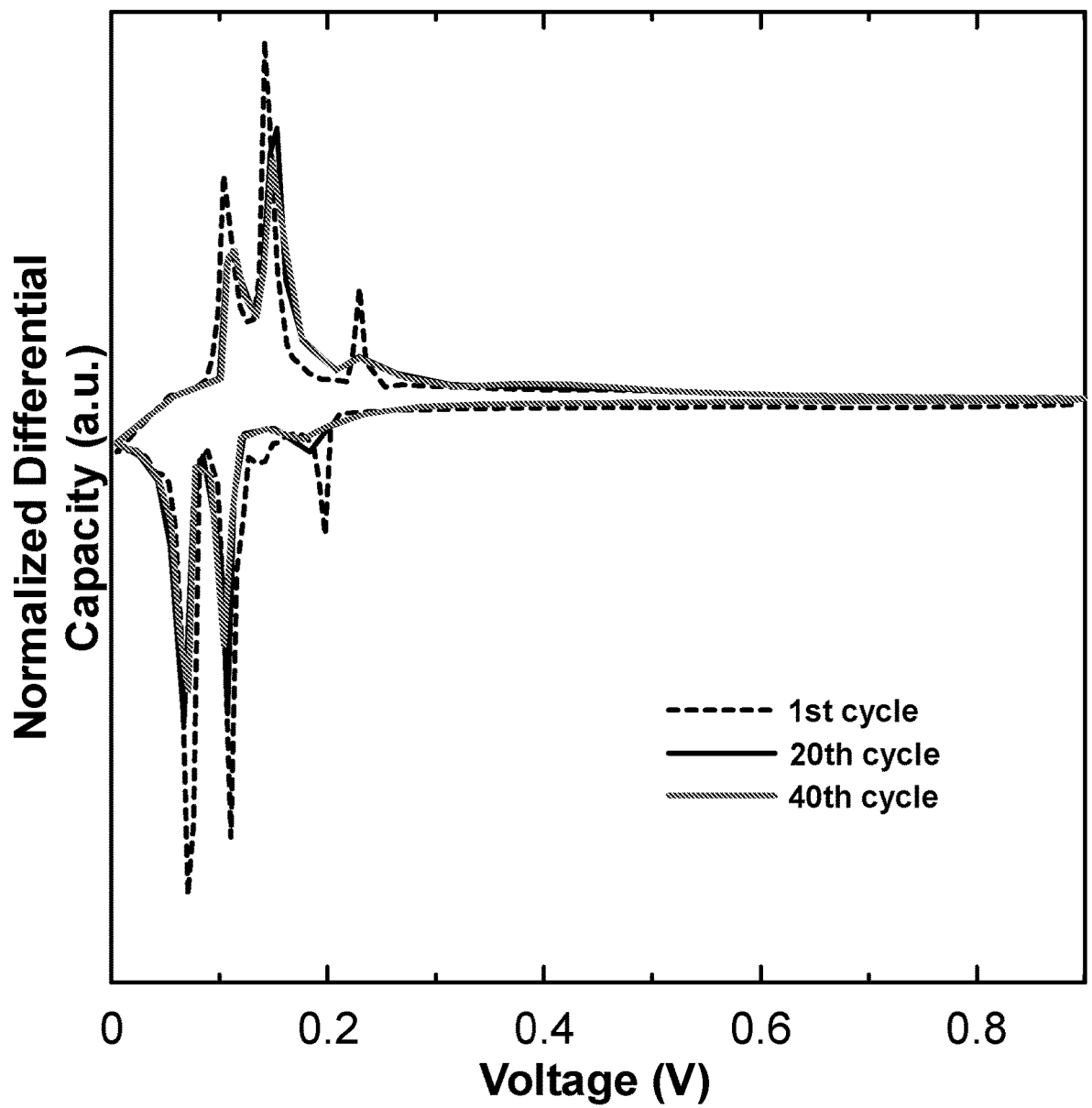
FIG. 14 shows the corresponding differential capacity curve obtained from a cell comprising uncalendered IE90* inventive sample.

FIG. 14 shows the corresponding differential capacity curve obtained from a cell comprising uncalendered IE90* inventive sample.

Figure 15:
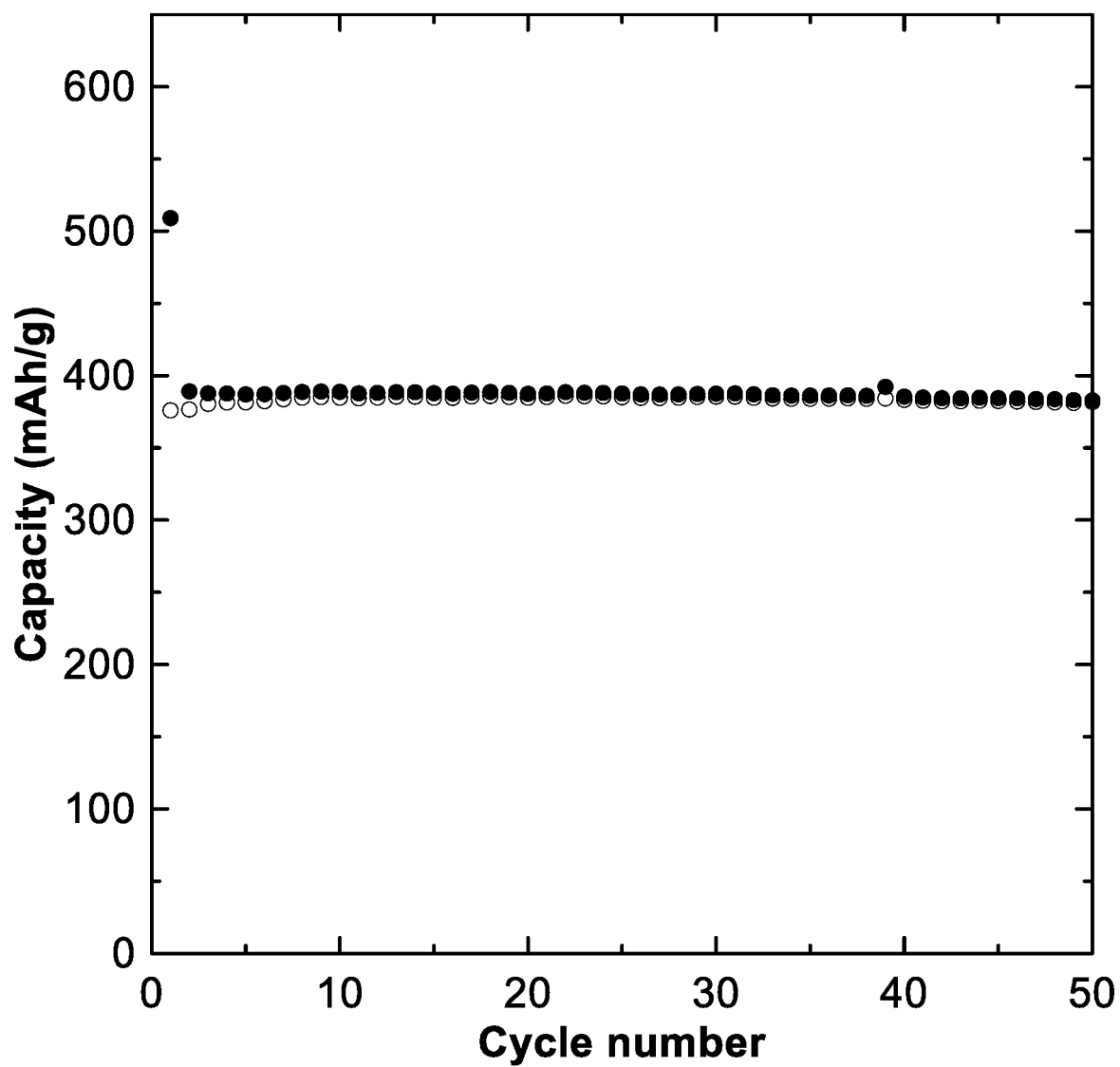
FIG. 15 shows the cycling performance of a cell comprising uncalendered IE90* inventive sample.

FIG. 15 shows the cycling performance of a cell comprising uncalendered IE90* inventive sample. Closed symbols indicate lithiation capacity and open symbols indicate delithiation capacity.

Figure 18:
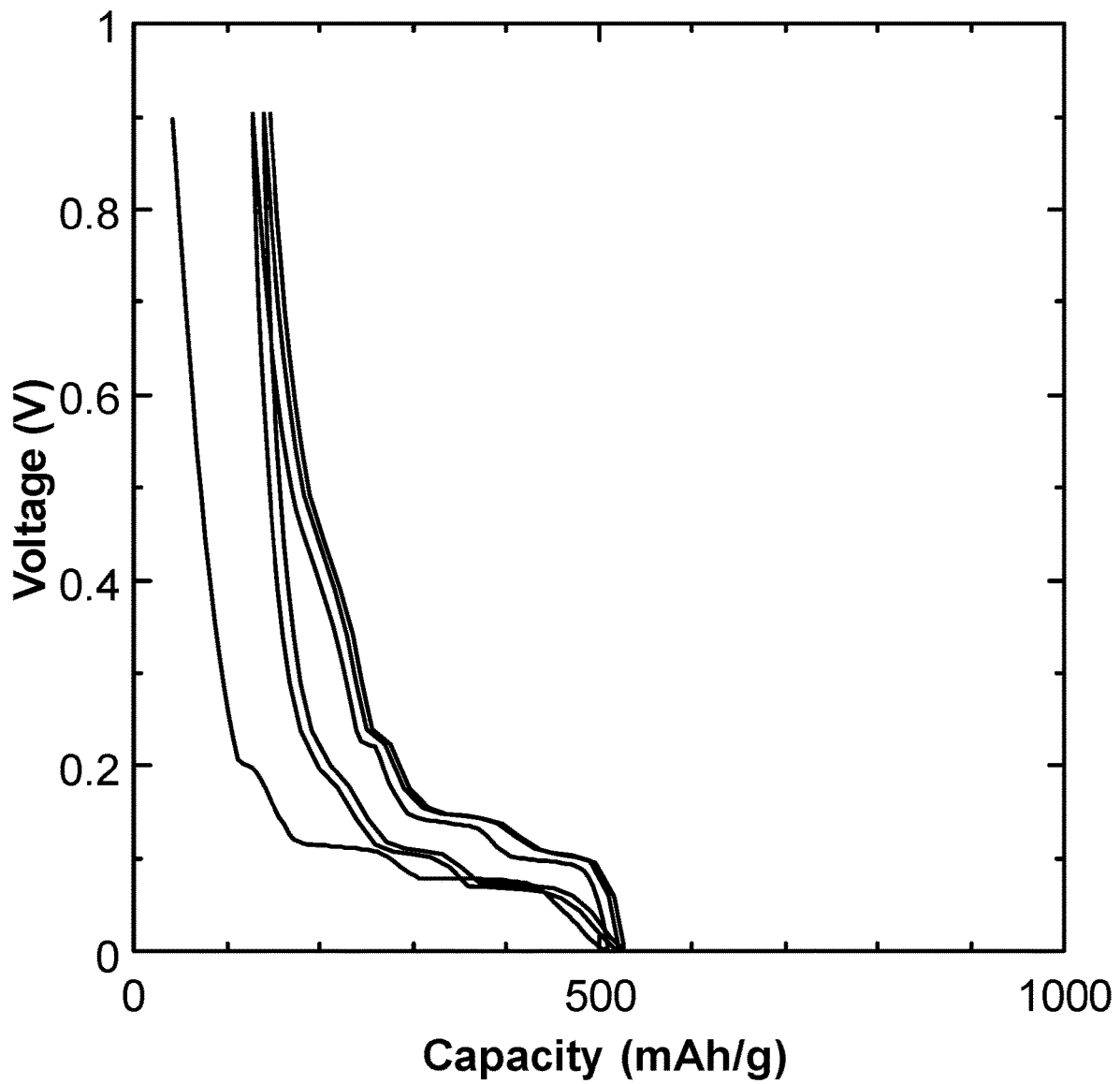
FIG. 18 shows the voltage curve obtained from a cell comprising uncalendered IE135* inventive sample.

FIG. 18 shows the voltage curve obtained from a cell comprising uncalendered IE135* inventive sample.

Figure 5:
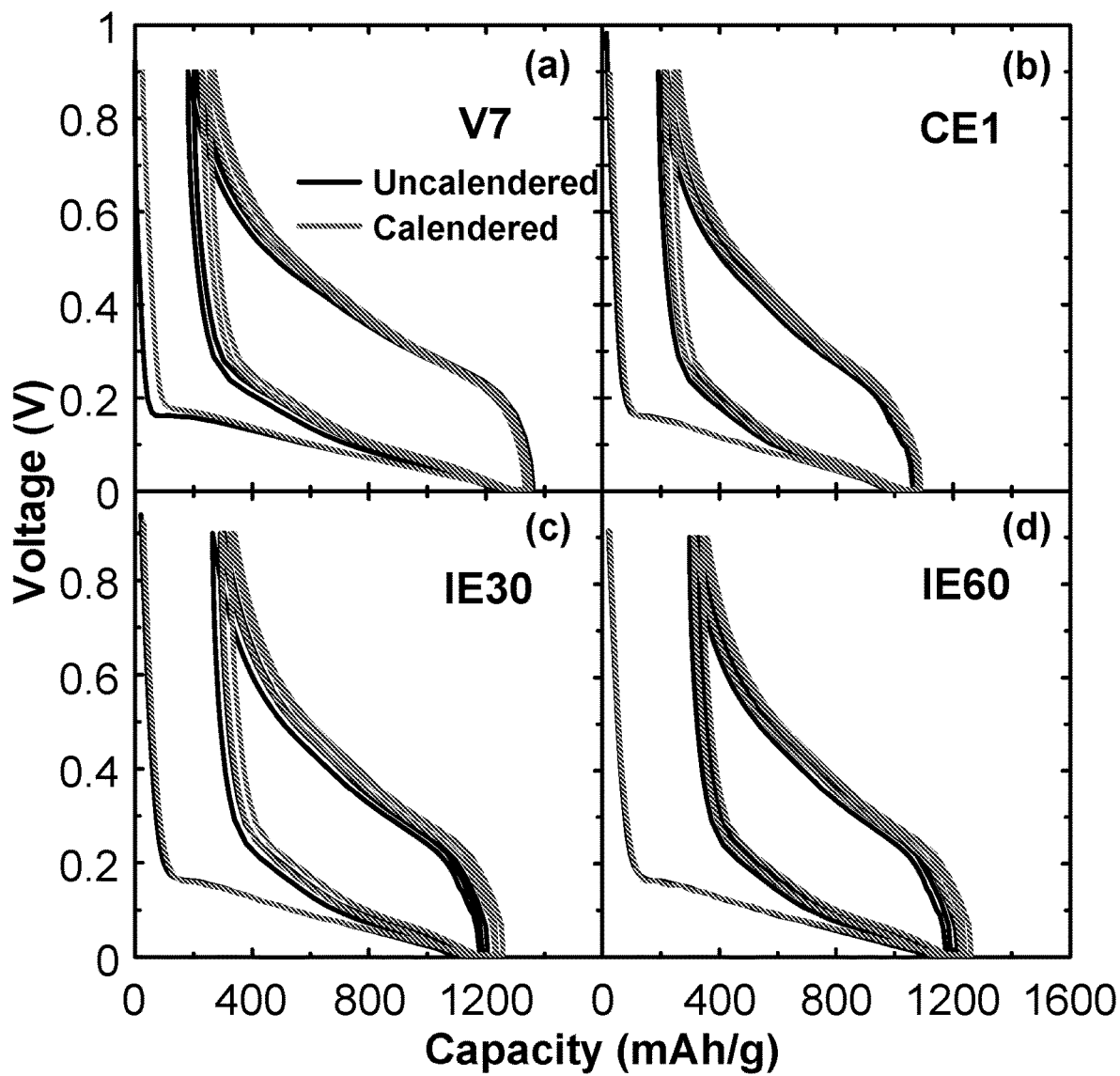
FIGS. 5a through 5d show the voltage curves obtained from cells comprising uncalendered and calendered electrodes of V7 alloy, the CE1 planetary milled comparative sample, and the IE30 and IE60 mechanofused inventive samples respectively.
Figure 6:
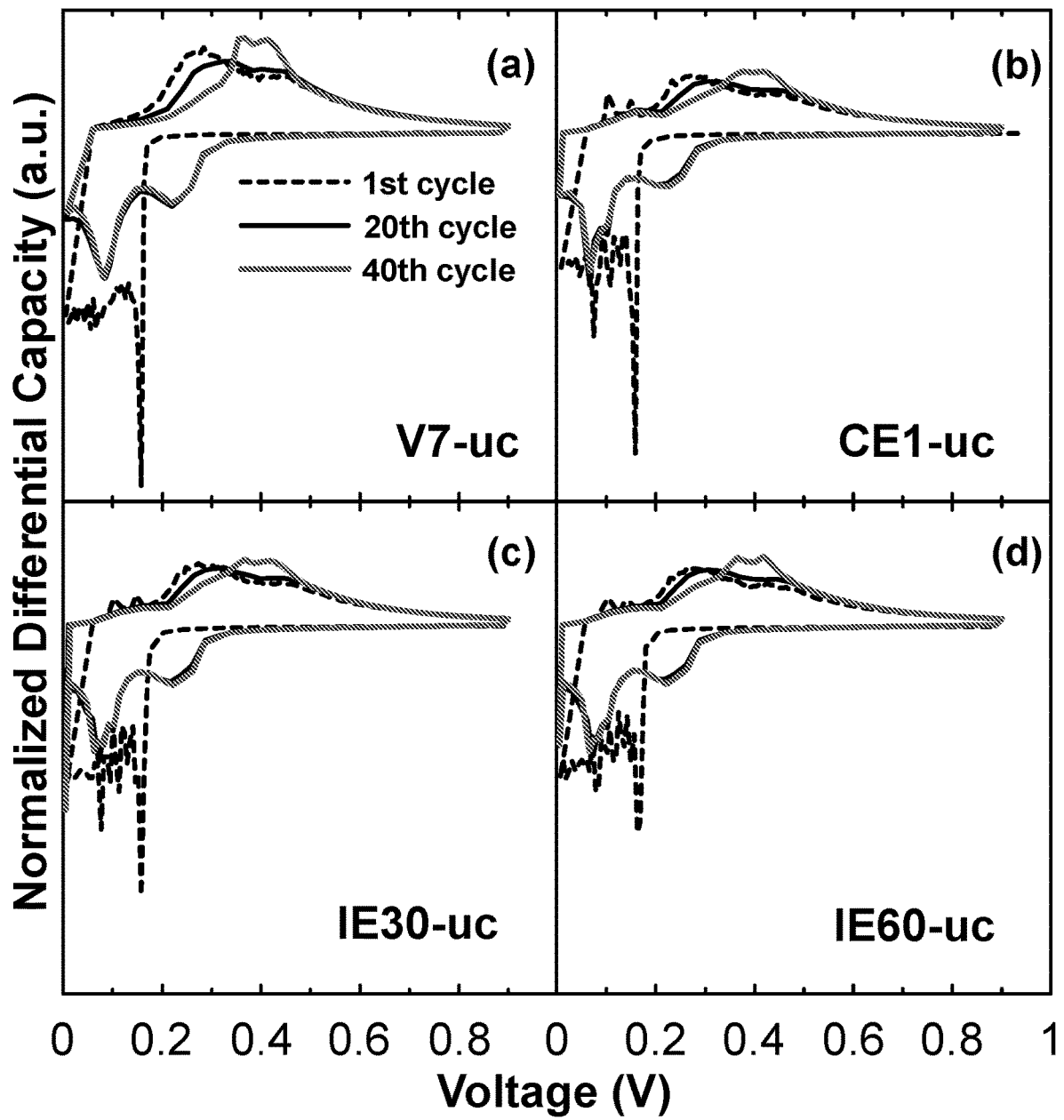
FIGS. 6a through 6d show the corresponding differential capacity curves obtained from cells comprising uncalendered electrodes of V7 alloy, the CE1 planetary milled comparative sample, and the IE30 and IE60 mechanofused inventive samples respectively.
Figure 7:
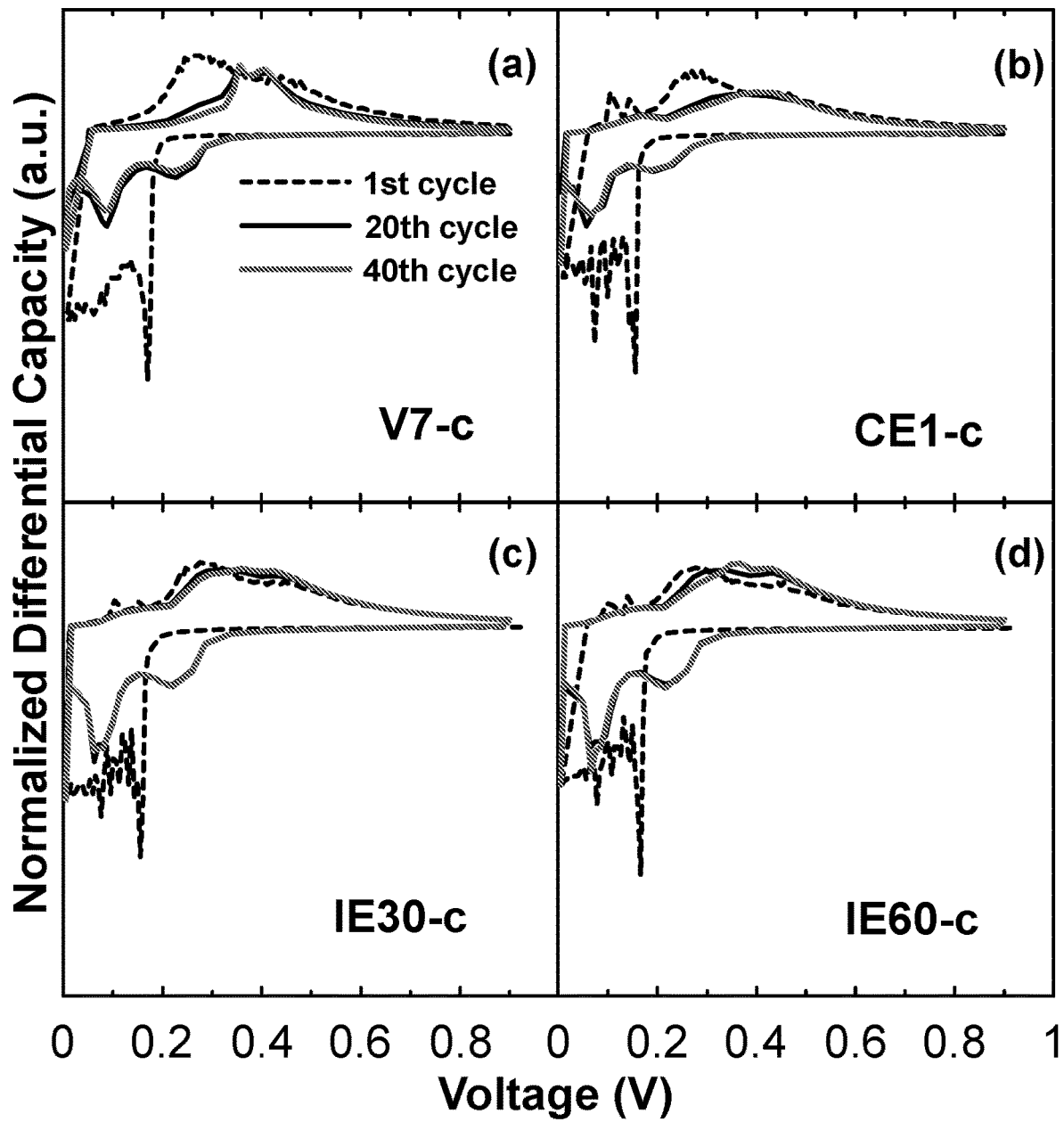
FIGS. 7a through 7d show the corresponding differential capacity curves obtained from cells comprising calendered electrodes of V7 alloy, the CE1 planetary milled comparative sample, and the IE30 and IE60 mechanofused inventive samples respectively.

As is evident from FIG. 5a, for neat V7 electrodes, only characteristic lithiation/delithiation plateaus of Si are observed. The reversible capacity decreases after calendering, which might be related to the particle fracture during calendaring. For all the other electrodes which contain KS6L graphite, delithiation plateaus at 0.1-0.2 V, which are related to delithiation from graphite, are observed. The reversible capacities of CE1 and IE30 slightly decrease after calendering. For IE60, no obvious reduction of reversible capacity is observed.

The voltage curves of both the inventive and comparative samples are characteristic of Si active/inactive alloys with <50 nm grain sizes, having no $Li_{15}Si_4$ formation when cycled below 50 mV.

A lithiation peak at ~0.16-0.2V is present in the differential capacity curves for all materials shown in FIGS. 6a-d during the first lithiation. This peak is related to the nucleation and growth of Li—Si phases during initial lithiation. This peak becomes less pronounced in the inventive samples prepared by MF. Features related to both graphite and amorphous silicon are observed during the initial delithiation of the samples containing V7 alloy and graphite. Two delithiation peaks of graphite phase are present at ~0.1-0.2 V. As cycling progresses, these two delithiation peaks become less pronounced as the cycling rate is increased from C/20 to C/5. Two delithiation peaks at about 0.38 V and 0.42 V were found to grow during cycling. The presence of these two peaks may be associated with $Li_{15}Si_4$ that is formed in different environments in the alloy. For instance, the Si near the middle of Si regions in the alloy would have all Si nearest neighbors, while the Si at the edge of the Si regions would be next to inactive phases in the V7 alloy.

The cycling performance of cells comprising uncalendered and calendered electrodes are shown in FIGS. 8a and 8b respectively. The uncalendered V7-uc electrode has significant capacity fade, which is likely due to the large volume expansion of the alloy, resulting in mechanical failure of the coating and electrical disconnection of alloy particles during cycling. The cycling performance is improved by the introduction of graphite. All of the uncalendered silicon alloy-graphite sample electrodes show no capacity fade in the 50 cycles tested. However, both V7 and CE1 electrodes have significant capacity fade after calendering, as shown in FIG. 8b (the cell comprising the calendered CE1 electrode suffered 68.3% fade in 50 cycles).

In contrast, the inventive sample electrodes still cycle well after calendering with no capacity fade. The superior cycling performance of the inventive composites, e.g. that of sample IE30, compared to that CE1 is ascribed to the former's unique microstructure that comprises layers of graphite with 0.1-0.5 μm primary alloy particles embedded between the layers and the higher crystallinity of the graphite matrix in the inventive samples, as evidenced by their smaller $d_{002}$ graphite spacing.

The superior cycling performance of the inventive dispersions, e.g. that of sample IE60, compared to that CE1 is ascribed to the former's unique microstructure in which primary alloy particles are well dispersed with graphite particles. In contrast, CE1 comprises alloy secondary particles dispersed with graphite particles.

The coating volumetric capacity and energy density were calculated based on the cell stack model described in M. N. Obrovac and V. L. Chevrier, *Chem. Rev.*, 2014, 114, 11444-11502. The energy density of the calendered V7 and CE1 electrodes only result in a theoretical energy improvement of ~1-2% over a commercial $LiCoO_2$/graphite cell stack baseline (726 Wh/L). By contrast, the energy density of calendered IE30 and IE60 electrodes theoretically would result in an energy density improvement of ~8-10%. It is expected that further improvements could be obtained if the alloy content were increased further.

In order to further investigate the fading phenomenon of the samples, their coulombic efficiencies as a function of cycle number were plotted in FIG. 8c and FIG. 8d. While cycle fade is sensitive to particle disconnection, coulombic efficiency is more sensitive to irreversible reactions related to electrolyte decomposition. For instance, while the uncalendered V7-uc electrode shows capacity fade in FIG. 10a, indicating particle disconnection, its coulombic efficiency is high (>99.5%), which indicates a low amount of irreversible electrolyte reactions are taking place. High coulombic efficiency values are also observed for all of the uncalendered electrodes. In contrast, the calendered V7-c electrode has a low coulombic efficiency of only ~98.5%, indicating a higher level of electrolyte reactivity. This is most likely due to the observed pulverization of the silicon alloy particles during the calendering process, which increases the alloy surface area and, moreover, creates fresh alloy surfaces which are not protected by the binder used. Similarly, the calendered CE1 electrode also has a low coulombic efficiency, which is also likely related to the observed pulverization of the poorly dispersed Si regions in the electrode during calendering, due to the presence of secondary alloy particles. In contrast, the coulombic efficiency values of inventive samples remain high, even after calendering. This reflects the ability of these electrodes to be calendered without fracturing the alloy particles. These results show the importance of deagglomerating secondary alloy particles into primary alloy particles and obtaining a good dispersion of the primary alloy particles and graphite in calendered alloy coatings and also shows that dry MF processing is an excellent method to obtain good silicon primary alloy particle/graphite dispersions and composites.

The superiority of the electrode materials made by the MF process is also reflected in the calendered electrodes' rate capabilities, which are shown in FIG. 9. For the neat calendered V7-c electrode, the rate capability as well as the cycling performance is poor. The addition of KS6L graphite, results in improved rate capability for the calendered CE1-c electrode. However, the rate capability is still poor at very high rates. The rate capabilities of the calendered IE30-c and IE60-c electrodes are significantly improved. The IE60-c electrode exhibits excellent rate capacity with capacity of 950 mAh/g (i.e. 1473 Ah/L) and 900 mAh/g (i.e. 1432 Ah/L) retained at 2C and 4C, respectively. These results demonstrate that silicon-graphite dispersions and composites made with the MF dry process possess not only have good cycling performance, but also show excellent rate capability. This noticeable improvement suggests that electrical conductivity may be effectively enhanced in silicon-graphite samples made with the MF dry process.

The preceding examples demonstrate that mechanofusion can be used to make novel Si-alloy/graphite dispersions and composites that are particularly suitable for use in negative electrodes for rechargeable batteries. Use of the method of the invention can result in a unique microstructure in which, for instance, Si-alloy particles can be well dispersed and embedded between graphite layers. This special structure may both provide a buffer for Si-alloy expansion and may also protect the surface of the alloy from reacting with the electrolyte in rechargeable batteries. As a result, superior cyclability and rate capability can be achieved, along with high capacities, when compared to conventional Si-alloy graphite electrode materials.

All of the above U.S. patents, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. For instance, while the examples focused on materials showing electrochemical activity with lithium and on their expected performance as anodes in lithium ion batteries, it is expected that similar materials (e.g. Sn, Al) showing electrochemical activity with lithium or even other alkali or alkaline earth metals (e.g. Na) may be made using similar methods. Further, such materials may find use in other batteries or electrochemical devices. Such modifications are to be considered within the purview and scope of the claims appended hereto.

The invention claimed is:

1. A particulate composite comprising:
    a graphite matrix; and
    alloy particles within the graphite matrix wherein the alloy particles comprise an electrochemically active phase and an electrochemically inactive phase;
    wherein:
    the graphite matrix has a graphitic crystalline structure characterized by a $d_{002}$ spacing of less than 3.4 Å and a {002} x-ray diffraction peak with a FWHM of less than 0.4° as measured using $CuK_\alpha$ radiation;
    the active phase is amorphous or has an average grain size less than 50 nm; and
    the alloy particles are essentially embedded between layers in the graphite matrix.

2. The particulate composite of claim 1 wherein the active phase is electrochemically active with lithium and the inactive phase is electrochemically inactive to lithium.

3. The particulate composite of claim 1 wherein the graphite matrix is essentially absent any non-graphitic carbon.

4. The particulate composite of claim 1 wherein the active phase is selected from the group consisting of Si, Sn, and Al.

5. The particulate composite of claim 4 wherein the active phase is Si.

6. The particulate composite of claim 4 wherein the electrochemically inactive phase is a Si-M intermetallic compound wherein M is one or more of Ti, V, Cr, Mn, Fe, Co, Ni, Cu, Mo, and W.

7. The particulate composite of claim 6 wherein the electrochemically inactive phase is $FeSi_2$.

8. The particulate composite of claim 4 wherein the alloy particles comprise silicon and oxygen.

9. The particulate composite of claim 4 wherein the alloy particles comprise silicon and iron.

10. The particulate composite of claim 4 wherein the alloy particles comprise Si, $SiO_2$, and $FeSi_2$.

11. The particulate composite of claim 1 wherein the inactive phase is amorphous or has an average grain size less than 50 nm.

12. The particulate composite of claim 1 wherein the alloy particles within the graphite matrix are primary alloy particles with an average particle size of less than 1 μm.

13. The particulate composite of claim 1 wherein the alloy particles within the graphite matrix are primary alloy particles with an average particle size of greater than 0.1 μm.

14. The particulate composite of claim 1 wherein the particulate composite has an average particle size in the range from 5 to 50 μm.

15. The particulate composite of claim 14 wherein the particulate composite has an average particle size in the range from 5 to 10 μm.

16. The particulate composite of claim 1 wherein the particulate composite has a spherical shape.

17. The particulate composite of claim 1 wherein the particulate composite has a surface area of less than 10 m²/g.

18. A carbon coated particulate composite comprising the particulate composite of claim 1 coated with a carbonaceous material.

19. A method of making a particulate dispersion for a battery anode comprising graphite particles and alloy particles wherein the alloy particles comprise an electrochemically active phase and an electrochemically inactive phase, the method comprising:
   obtaining an amount of alloy particles comprising the active phase and the inactive phase;
   obtaining an amount of graphite particles; and
   mechanofusing the alloy particles with the graphite particles in a mechanofusion system, thereby dispersing the alloy particles and the graphite particles.

20. The method of claim 19 wherein:
   the graphite particles having a graphite matrix characterized by a graphitic crystalline structure with a $d_{002}$ spacing of less than 3.4 Å and a {002} x-ray diffraction peak with a FWHM of less than 0.4° as measured using $CuK_\alpha$ radiation;
   the active phase is amorphous or has an average grain size less than 50 nm; and
   the mechanofusing is performed for a time to essentially embed the alloy particles between layers in the graphite particles, whereby the particulate dispersion is a particulate composite.

21. The method of claim 19 wherein the alloy particles comprise silicon, oxygen, and iron.

22. The method of claim 19 wherein the graphite particles are spherical graphite particles or graphite flake particles.

23. The method of claim 19 wherein the weight ratio of the obtained alloy particles comprising the active phase and the inactive phase to that of the obtained graphite particles is about 1:4.

24. The method of claim 19 wherein the mechanofusing is performed at least until the surface area of the mechanofused alloy particles is less than that of the obtained alloy particles comprising the active phase and the inactive phase plus that of the obtained graphite particles prior to mechanofusing.

25. The method of claim 19 wherein the mechanofusing is performed for greater than 30 minutes.

26. The method of claim 19 wherein the mechanofusion system comprises a chamber, a rotating wall within the chamber, a scraper within the rotating wall, and a press-head within the rotating wall.

27. The method of claim 26 wherein the mechanofusing step comprises:
   setting a gap of about 0.5 mm between the scraper and the rotating wall;
   setting a gap of about 1.4 mm between the press-head and the rotating wall; and
   rotating the rotating wall at about 2500 rpm.

28. A particulate dispersion comprising graphite particles and alloy particles made according to the method of claim 19.

29. A particulate composite comprising a graphite matrix and alloy particles within the graphite matrix made according to the method of claim 20.

30. A lithium insertion anode for a rechargeable lithium battery comprising the particulate composite of claim 1.

31. A lithium insertion anode for a rechargeable lithium battery comprising the particulate dispersion of claim 28.

32. A rechargeable lithium battery comprising a lithium insertion cathode, a lithium cation conducting electrolyte, and a lithium insertion anode wherein the anode comprises the particulate composite of claim 1.

33. A rechargeable lithium battery comprising a lithium insertion cathode, a lithium cation conducting electrolyte, and a lithium insertion anode wherein the anode comprises the particulate dispersion of claim 28.

* * * * *